United States Patent
Hosseini et al.

(10) Patent No.: US 12,342,177 B2
(45) Date of Patent: Jun. 24, 2025

(54) TECHNIQUES FOR DYNAMIC SPECTRUM SHARING ACROSS RADIO ACCESS TECHNOLOGIES

(71) Applicant: QUALCOMM Incorporated, San Diego, CA (US)

(72) Inventors: Seyedkianoush Hosseini, San Diego, CA (US); Jing Jiang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 17/876,390

(22) Filed: Jul. 28, 2022

(65) Prior Publication Data
US 2024/0040389 A1  Feb. 1, 2024

(51) Int. Cl.
*H04W 16/14*   (2009.01)
*H04W 72/1263*  (2023.01)
*H04W 72/566*   (2023.01)

(52) U.S. Cl.
CPC ....... *H04W 16/14* (2013.01); *H04W 72/1263* (2013.01); *H04W 72/569* (2023.01)

(58) Field of Classification Search
CPC . H04W 16/00; H04W 16/14; H04W 72/1263; H04W 72/569; H04W 88/06; H04W 72/1215; H04W 72/04; H04B 7/0452
See application file for complete search history.

(56) References Cited

U.S. PATENT DOCUMENTS

| | | | |
|---|---|---|---|
| 8,514,798 B2* | 8/2013 | Lee | H04B 1/406 370/338 |
| 2018/0368153 A1 | 12/2018 | Li et al. | |
| 2018/0368199 A1 | 12/2018 | Zeng et al. | |
| 2019/0013881 A1* | 1/2019 | Olesen | H04B 7/0413 |
| 2019/0274148 A1 | 9/2019 | Xiong et al. | |
| 2021/0250773 A1* | 8/2021 | Bhaskaran | H04W 72/1215 |
| 2021/0258977 A1* | 8/2021 | Stephenne | H04W 16/14 |
| 2021/0282104 A1 | 9/2021 | Sagar et al. | |

(Continued)

OTHER PUBLICATIONS

International Search Report and Written Opinion—PCT/US2023/069716—ISA/EPO—Oct. 10, 2023.

*Primary Examiner* — Mohamed A Kamara
(74) *Attorney, Agent, or Firm* — Dalei Dong; Holland & Hart LLP

(57) ABSTRACT

Methods, systems, and devices for wireless communications are described. A user equipment (UE) may receive, using a set of resources that are shared between a first radio access technology (RAT) and a second RAT, control signaling that includes a dynamic spectrum sharing (DSS) configuration for a shared data channel. The UE may receive one or more indicators associated with the first RAT, the second RAT, or both, to coordinate communications for the shared set of resources. The UE may communicate with the network using the first RAT or the second RAT based on applying one or more of the indicators. To further support DSS, the UE may transmit UE capability information to indicate whether the UE is capable of DSS for the first RAT and the second RAT, and may apply one or more multiplexing modes for communications using the first RAT and the second RAT.

26 Claims, 22 Drawing Sheets

(56) References Cited

U.S. PATENT DOCUMENTS

| | | | | |
|---|---|---|---|---|
| 2022/0150713 A1* | 5/2022 | Zhou | ............... | H04W 72/1263 |
| 2023/0354170 A1* | 11/2023 | Wang | ............... | H04W 72/1215 |
| 2024/0215011 A1* | 6/2024 | Cheng | ............... | H04B 17/328 |
| 2024/0314784 A1* | 9/2024 | El Hamss | ......... | H04W 72/1273 |

* cited by examiner

TECHNIQUES FOR DYNAMIC SPECTRUM SHARING ACROSS RADIO ACCESS TECHNOLOGIES

FIELD OF DISCLOSURE

The present disclosure, for example, relates to wireless communications systems, more particularly to techniques for dynamic spectrum sharing (DSS) across radio access technologies (RATs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a cell that supports a first radio access technology (RAT) and a second RAT may employ various dynamic spectrum sharing (DSS) techniques to enable devices associated with the first RAT and devices associated with the second RAT to communicate within a radio frequency (RF) spectrum band.

SUMMARY

The described techniques relate to improved methods, systems, devices, and apparatuses that support techniques for dynamic spectrum sharing (DSS) across radio access technologies (RATs). For example, the described techniques provide for signaling using multiple RATs on a shared radio frequency spectrum band. To support coexistence between different RATs, a device such as a user equipment (UE) may implement DSS techniques to perform wireless communications using the different RATs using a set of shared resources. Some such DSS techniques include re-framing of radio frequency spectrum bands used for the different RATs, splitting resources between different RATs, dynamic resource allocation across the different RATs, and so on.

In some examples, devices may implement additional techniques to enhance DSS and to support coexistence between RATs. For example, a UE may receive one or more dynamic indicators to coordinate communications for the set of shared resources. The one or more dynamic indicators may be associated with a first RAT, a second RAT, or both, and may include preemption information, cancellation information, or slot format information for communications on the first and second RATs. The UE may communicate using the first RAT or the second RAT based on identifying, decoding, and applying the one or more indicators. In some other examples, the UE may transmit capability information which indicates DSS capabilities and one or more multiplexing modes that the UE may apply for communications associated with the first RAT and the second RAT. The UE may apply the one or more multiplexing modes based on UE capability.

A method for wireless communication at a UE is described. The method may include receiving, using a set of resources that are shared between a first RAT and a second RAT, control signaling indicating a DSS configuration for a channel shared between the RAT and the second RAT, receiving, based on the DSS configuration, one or more indicators to coordinate communications for the set of resources, the one or more indicators being associated with the first RAT, the second RAT, or both, and communicating one or more scheduled communications associated with the first RAT or the second RAT using the channel based on applying the one or more indicators to the one or more scheduled communications.

An apparatus for wireless communication at a UE is described. The apparatus may include a processor, memory coupled with the processor, and instructions stored in the memory. The instructions may be executable by the processor to cause the apparatus to receive, using a set of resources that are shared between a first RAT and a second RAT, control signaling indicating a DSS configuration for a channel shared between the RAT and the second RAT, receive, based on the DSS configuration, one or more indicators to coordinate communications for the set of resources, the one or more indicators being associated with the first RAT, the second RAT, or both, and communicate one or more scheduled communications associated with the first RAT or the second RAT using the channel based on applying the one or more indicators to the one or more scheduled communications.

Another apparatus for wireless communication at a UE is described. The apparatus may include means for receiving, using a set of resources that are shared between a first RAT and a second RAT, control signaling indicating a DSS configuration for a channel shared between the RAT and the second RAT, means for receiving, based on the DSS configuration, one or more indicators to coordinate communications for the set of resources, the one or more indicators being associated with the first RAT, the second RAT, or both, and means for communicating one or more scheduled communications associated with the first RAT or the second RAT using the channel based on applying the one or more indicators to the one or more scheduled communications.

A non-transitory computer-readable medium storing code for wireless communication at a UE is described. The code may include instructions executable by a processor to receive, using a set of resources that are shared between a first RAT and a second RAT, control signaling indicating a DSS configuration for a channel shared between the RAT and the second RAT, receive, based on the DSS configuration, one or more indicators to coordinate communications for the set of resources, the one or more indicators being associated with the first RAT, the second RAT, or both, and communicate one or more scheduled communications associated with the first RAT or the second RAT using the channel based on applying the one or more indicators to the one or more scheduled communications.

In some examples of the method, apparatuses, and non-transitory computer-readable medium described herein, the one or more indicators include a first set of indicators associated with the first RAT and a second set of indicators associated with the second RAT and the method, apparatuses, and non-transitory computer-readable medium may include further operations, features, means, or instructions for applying the first set of indicators during communications associated with the first RAT and applying the second set of indicators during communications associated with the second RAT.

In some examples of the method, apparatuses, and non-transitory computer-readable medium described herein, receiving the one or more indicators may include operations, features, means, or instructions for receiving, while operating in accordance with the second RAT, a first set of indicators of the one or more indicators associated with the first RAT using a channel that may be associated with the first RAT and applying the first set of indicators to coordinate the one or more scheduled communications for the first RAT and the second RAT based on the DSS configuration.

Some examples of the method, apparatuses, and non-transitory computer-readable medium described herein may further include operations, features, means, or instructions for receiving, while operating in accordance with the second RAT, a second set of indicators of the one or more indicators associated with the second RAT, the second set of indicators being different from the first set of indicators and applying the second set of indicators to coordinate the one or more scheduled communications for the first RAT and the second RAT based on the DSS configuration.

In some examples of the method, apparatuses, and non-transitory computer-readable medium described herein, receiving the one or more indicators may include operations, features, means, or instructions for receiving a first indicator that conflicts with at least a second indicator of the one or more indicators, applying a set of priority rules based on the conflict, and applying the first indicator or the second indicator in accordance with the set of priority rules.

In some examples of the method, apparatuses, and non-transitory computer-readable medium described herein, the set of priority rules indicate a priority based on RAT type, channel type, information type, scheduling type, physical channel properties, channel use case, or any combination thereof.

In some examples of the method, apparatuses, and non-transitory computer-readable medium described herein, the one or more indicators include one or more preemption indications, one or more cancellation indications, one or more slot format indications, one or more power control indications, or any combination thereof.

In some examples of the method, apparatuses, and non-transitory computer-readable medium described herein, the first RAT associated with a first subcarrier spacing and the second RAT associated with a second subcarrier spacing that may be different from the first subcarrier spacing.

In some examples of the method, apparatuses, and non-transitory computer-readable medium described herein, the first RAT includes a fifth generation (5G) RAT and the second RAT includes a sixth generation (6G) RAT.

A method for wireless communication at a network entity is described. The method may include transmitting, using a set of resources that are shared between a first RAT and a second RAT supported by a UE, control signaling indicating a DSS configuration for a channel shared between the first RAT and the second RAT, transmitting, to the UE, based on the DSS configuration, one or more indicators to coordinate communications using the set of resources, the one or more indicators being associated with the first RAT, the second RAT, or both, and communicating with the UE in accordance with the DSS configuration using the channel based on the one or more indicators.

An apparatus for wireless communication at a network entity is described. The apparatus may include a processor, memory coupled with the processor, and instructions stored in the memory. The instructions may be executable by the processor to cause the apparatus to transmit, using a set of resources that are shared between a first RAT and a second RAT supported by a UE, control signaling indicating a DSS configuration for a channel shared between the first RAT and the second RAT, transmit, to the UE, based on the DSS configuration, one or more indicators to coordinate communications using the set of resources, the one or more indicators being associated with the first RAT, the second RAT, or both, and communicate with the UE in accordance with the DSS configuration using the channel based on the one or more indicators.

Another apparatus for wireless communication at a network entity is described. The apparatus may include means for transmitting, using a set of resources that are shared between a first RAT and a second RAT supported by a UE, control signaling indicating a DSS configuration for a channel shared between the first RAT and the second RAT, means for transmitting, to the UE, based on the DSS configuration, one or more indicators to coordinate communications using the set of resources, the one or more indicators being associated with the first RAT, the second RAT, or both, and means for communicating with the UE in accordance with the DSS configuration using the channel based on the one or more indicators.

A non-transitory computer-readable medium storing code for wireless communication at a network entity is described. The code may include instructions executable by a processor to transmit, using a set of resources that are shared between a first RAT and a second RAT supported by a UE, control signaling indicating a DSS configuration for a channel shared between the first RAT and the second RAT, transmit, to the UE, based on the DSS configuration, one or more indicators to coordinate communications using the set of resources, the one or more indicators being associated with the first RAT, the second RAT, or both, and communicate with the UE in accordance with the DSS configuration using the channel based on the one or more indicators.

In some examples of the method, apparatuses, and non-transitory computer-readable medium described herein, the one or more indicators include a first set of indicators applicable to communications associated with the first RAT and a second set of indicators applicable to communications associated with the second RAT.

In some examples of the method, apparatuses, and non-transitory computer-readable medium described herein, receiving the one or more indicators may include operations, features, means, or instructions for transmitting a first set of indicators of the one or more indicators associated with the first RAT using a channel that may be associated with the first RAT and receiving one or more communications using the first RAT and the second RAT based on the DSS configuration.

Some examples of the method, apparatuses, and non-transitory computer-readable medium described herein may further include operations, features, means, or instructions for transmitting a second set of indicators of the one or more indicators associated with the second RAT, the second set of indicators being different from the first set of indicators and receiving one or more communications associated with the first RAT and the second RAT based on the DSS configuration.

In some examples of the method, apparatuses, and non-transitory computer-readable medium described herein, the one or more indicators include one or more preemption indications, one or more cancellation indications, one or more slot format indications, one or more power control indications, or any combination thereof.

In some examples of the method, apparatuses, and non-transitory computer-readable medium described herein, the first RAT associated with a first subcarrier spacing and the second RAT associated with a second subcarrier spacing that may be different from the first subcarrier spacing.

A method for wireless communication at a UE is described. The method may include transmitting a message that includes an indication of DSS for a set of resources that are shared between a first RAT and a second RAT, applying, in accordance with the indication, one or more multiplexing modes to communications associated with the first RAT and the second RAT using the set of resources, and communicating using the first RAT and the second RAT using the set of resources based on applying the one or more multiplexing modes.

An apparatus for wireless communication at a UE is described. The apparatus may include a processor, memory coupled with the processor, and instructions stored in the memory. The instructions may be executable by the processor to cause the apparatus to transmit a message that includes an indication of DSS for a set of resources that are shared between a first RAT and a second RAT, apply, in accordance with the indication, one or more multiplexing modes to communications associated with the first RAT and the second RAT using the set of resources, and communicate using the first RAT and the second RAT using the set of resources based on applying the one or more multiplexing modes.

Another apparatus for wireless communication at a UE is described. The apparatus may include means for transmitting a message that includes an indication of DSS for a set of resources that are shared between a first RAT and a second RAT, means for applying, in accordance with the indication, one or more multiplexing modes to communications associated with the first RAT and the second RAT using the set of resources, and means for communicating using the first RAT and the second RAT using the set of resources based on applying the one or more multiplexing modes.

A non-transitory computer-readable medium storing code for wireless communication at a UE is described. The code may include instructions executable by a processor to transmit a message that includes an indication of DSS for a set of resources that are shared between a first RAT and a second RAT, apply, in accordance with the indication, one or more multiplexing modes to communications associated with the first RAT and the second RAT using the set of resources, and communicate using the first RAT and the second RAT using the set of resources based on applying the one or more multiplexing modes.

Some examples of the method, apparatuses, and non-transitory computer-readable medium described herein may further include operations, features, means, or instructions for applying the one or more multiplexing modes based on the indication, where the one or more multiplexing modes include a time-division multiplexing (TDM) mode, a frequency-division multiplexing (FDM) mode, a spatial-division multiplexing (SDM) mode, or any combination thereof.

In some examples of the method, apparatuses, and non-transitory computer-readable medium described herein, the first RAT may be associated with a first waveform and the second RAT may be associated with a second waveform and the method, apparatuses, and non-transitory computer-readable medium may include further operations, features, means, or instructions for applying the one or more multiplexing modes based on the first waveform and the second waveform, where the one or more multiplexing modes include a TDM mode, a FDM mode, a SDM mode, or any combination thereof.

Some examples of the method, apparatuses, and non-transitory computer-readable medium described herein may further include operations, features, means, or instructions for applying the one or more multiplexing modes based on a type of communications associated with the first RAT and the second RAT scheduled for the set of resources.

In some examples of the method, apparatuses, and non-transitory computer-readable medium described herein, the one or more multiplexing modes include a FDM mode and the method, apparatuses, and non-transitory computer-readable medium may include further operations, features, means, or instructions for communicating a first set of signals associated with the first RAT using a first set of antennas and communicating a second set of signals associated with the second RAT using a second set of antennas, the first set of antennas being different from the second set of antennas based on the one or more multiplexing modes.

In some examples of the method, apparatuses, and non-transitory computer-readable medium described herein, the first set of signals associated with the first RAT may be associated with a first set of carriers and the second set of signals associated with the second RAT may be associated with a second set of carriers.

In some examples of the method, apparatuses, and non-transitory computer-readable medium described herein, the message further indicates a first number of antenna ports supported for the first RAT, a second number of antenna ports supported for the second RAT, or a third number of antenna ports supported for both the first RAT and the second RAT.

Some examples of the method, apparatuses, and non-transitory computer-readable medium described herein may further include operations, features, means, or instructions for transmitting a set of one or more channels using the set of resources in accordance with the indication, the set of one or more channels being common to the first RAT and the second RAT.

In some examples of the method, apparatuses, and non-transitory computer-readable medium described herein, the first RAT associated with a first subcarrier spacing and the second RAT associated with a second subcarrier spacing that may be different from the first subcarrier spacing.

In some examples of the method, apparatuses, and non-transitory computer-readable medium described herein, the first RAT includes a fifth generation (5G) RAT and the second RAT includes a sixth generation (6G) RAT.

In some examples of the method, apparatuses, and non-transitory computer-readable medium described herein, the indication includes a UE capability indication for the UE to support DSS for the set of resources that may be shared between the first RAT and the second RAT.

A method for wireless communication at a network entity is described. The method may include receiving a message that includes an indication of a UE capability to support DSS using a set of resources shared between a first RAT and a second RAT and communicating with a UE using one or more multiplexing modes associated with the first RAT and the second RAT using the set of resources.

An apparatus for wireless communication at a network entity is described. The apparatus may include a processor, memory coupled with the processor, and instructions stored in the memory. The instructions may be executable by the processor to cause the apparatus to receive a message that includes an indication of a UE capability to support DSS using a set of resources shared between a first RAT and a second RAT and communicate with a UE using one or more multiplexing modes associated with the first RAT and the second RAT using the set of resources.

Another apparatus for wireless communication at a network entity is described. The apparatus may include means for receiving a message that includes an indication of a UE capability to support DSS using a set of resources shared between a first RAT and a second RAT and means for communicating with a UE using one or more multiplexing modes associated with the first RAT and the second RAT using the set of resources.

A non-transitory computer-readable medium storing code for wireless communication at a network entity is described. The code may include instructions executable by a processor to receive a message that includes an indication of a UE capability to support DSS using a set of resources shared between a first RAT and a second RAT and communicate with a UE using one or more multiplexing modes associated with the first RAT and the second RAT using the set of resources.

Some examples of the method, apparatuses, and non-transitory computer-readable medium described herein may further include operations, features, means, or instructions for communicating with the UE using the one or more multiplexing modes based on the indication, where the one or more multiplexing modes include a TDM mode, a FDM mode, a SDM mode, or any combination thereof.

In some examples of the method, apparatuses, and non-transitory computer-readable medium described herein, the first RAT may be associated with a first waveform and the second RAT may be associated with a second waveform and the method, apparatuses, and non-transitory computer-readable medium may include further operations, features, means, or instructions for communicating with the UE using the one or more multiplexing modes based on the first waveform and the second waveform, where the one or more multiplexing modes include a TDM mode, a FDM mode, a SDM mode, or any combination thereof.

Some examples of the method, apparatuses, and non-transitory computer-readable medium described herein may further include operations, features, means, or instructions for communicating with the UE using a first set of carriers associated with the first RAT and a second set of carriers associated with the second RAT.

(This summary will be completed upon final approval of the claims)

DETAILED DESCRIPTION

In some wireless communications systems, devices such as user equipment (UE) may support communications using multiple radio access technologies (RATs) using a set of shared resources or using a shared radio frequency spectrum band. To support coexistence between different RATs (for example, during network transition or advancement from one RAT to another), the wireless communications system may implement dynamic spectrum sharing (DSS) techniques to enable devices associated with different RATs to perform wireless communications in the same radio frequency spectrum band. DSS techniques may increase spectral efficiency, reduce resource overhead, and enable more efficient utilization of communications resources. For example, some techniques include re-framing of radio frequency spectrum bands used for the different RATs, splitting resources between different RATs, dynamic resource allocation across the different RATs, and so on.

As wireless communications advance, devices may implement additional techniques to enhance DSS and to support coexistence between RATs (e.g., between fifth generation RATs and sixth generation RATs, and beyond). Some such techniques may include coordination of dynamic scheduling indicators between RATs so that different services associated with each RAT may be efficiently scheduled across RATs. For example, dynamic scheduling indications (such as preemption indicators, slot format indicators, cancellation indicators, power control indicators) may be coordinated between the RATs so that the wireless devices know which communications to transmit or receive on each RAT. In such examples, a UE operating on one RAT can detect, decode, and apply these dynamic indications received for a different RAT on a set of resources shared by both RATs.

Additionally or alternatively, to support coexistence of one or more RATs in a shared radio frequency spectrum band, UEs may implement different multiplexing techniques based on UE capability to coordinate transmissions for each RAT. For example, a UE may apply different multiplexing schemes such as frequency division multiplexing (FDM), time division multiplexing (TDM), spatial division multiplexing (SDM), or a combination thereof, for transmitting communications on different RATs. In some examples, a UE may implement antenna sharing techniques for communications between RATs to further support coexistence.

Aspects of the disclosure are initially described in the context of wireless communications systems. Aspects of the disclosure are further illustrated by and described with reference to apparatus diagrams, system diagrams, process flows, and flowcharts that relate to techniques for DSS across RATs.

Figure 1:
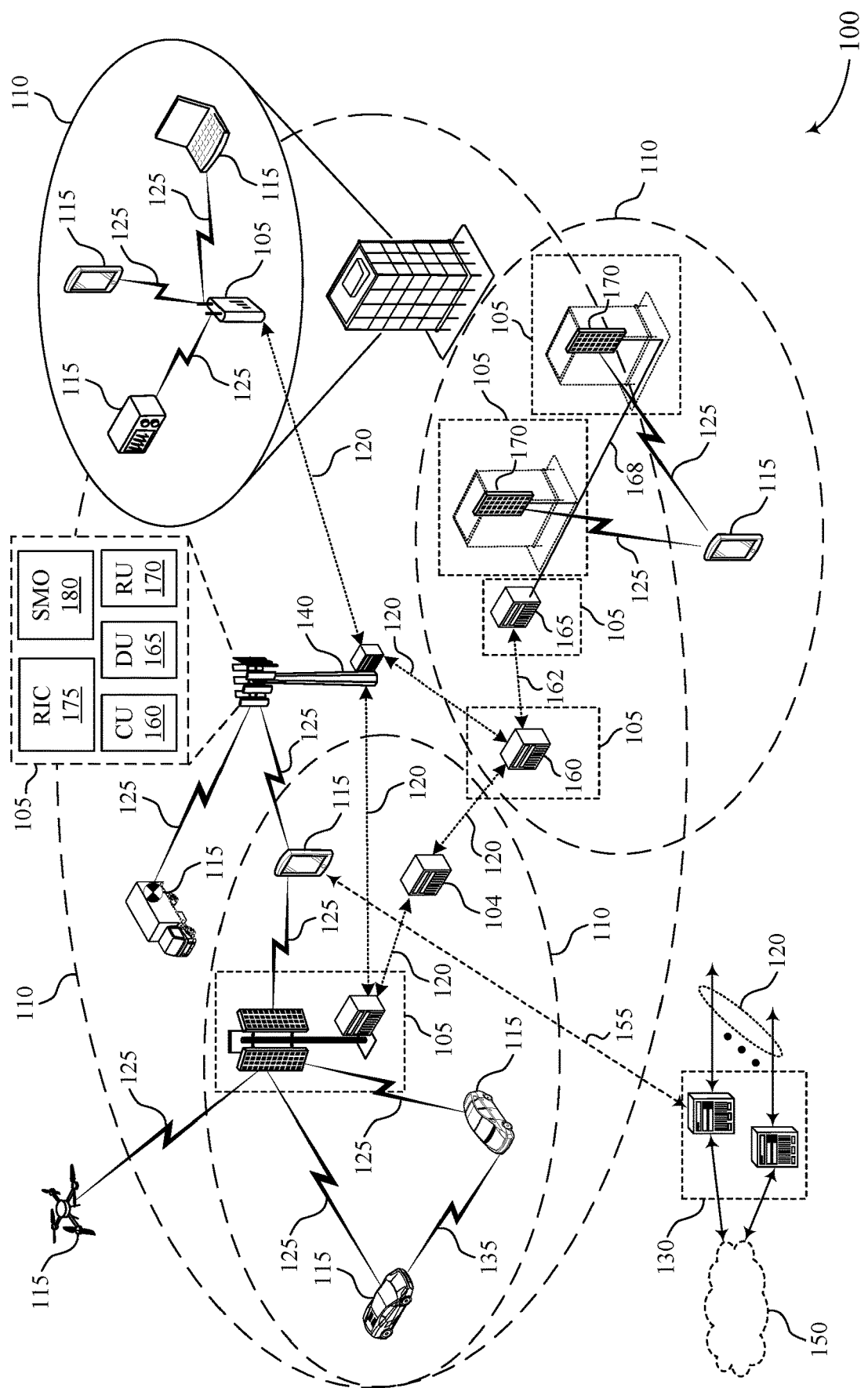
FIG. 1 illustrates an example of a wireless communications system 100 that supports techniques for dynamic spectrum sharing (DSS) across radio access technologies (RATs) in accordance with various aspects of the present disclosure.

FIG. 1 illustrates an example of a wireless communications system 100 that supports techniques for DSS across RATs in accordance with various aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more RATs (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140).

The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for DSS across RATs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, in which case $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more TDM techniques, FDM techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) radio frequency spectrum bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more radio frequency spectrum bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

Some UE 115 located within wireless communications system 100 may support communications using multiple RATs on a set of shared resources or on a shared radio frequency spectrum band. To support coexistence between different RATs, UEs 115 and other network devices may implement DSS techniques to enable devices associated with different RATs to perform wireless communications in the same radio frequency spectrum band. Some such DSS techniques include re-framing of radio frequency spectrum bands used for the different RATs, splitting resources between different RATs, dynamic resource allocation across the different RATs, and so on.

In some examples, devices may implement additional techniques to enhance DSS and to support coexistence between RATs (e.g., between fifth generation RATs and sixth generation RATs, and beyond). Some such techniques may include coordination of dynamic scheduling indicators between RATs so that different services associated with each RAT may be efficiently scheduled across RATs. For example, dynamic scheduling indications (such as preemption indicators, slot format indicators, cancellation indicators, power control indicators) may be coordinated between the RATs so that the wireless devices know which communications to transmit or receive on each RAT. In some other examples, UEs 115 may implement different multiplexing techniques or antenna sharing techniques based on UE capability to coordinate transmissions for each RAT. For example, a UE 115 may apply different multiplexing schemes such as FDM, TDM, SDM, or a combination thereof, for transmitting communications on different RATs.

Figure 2:
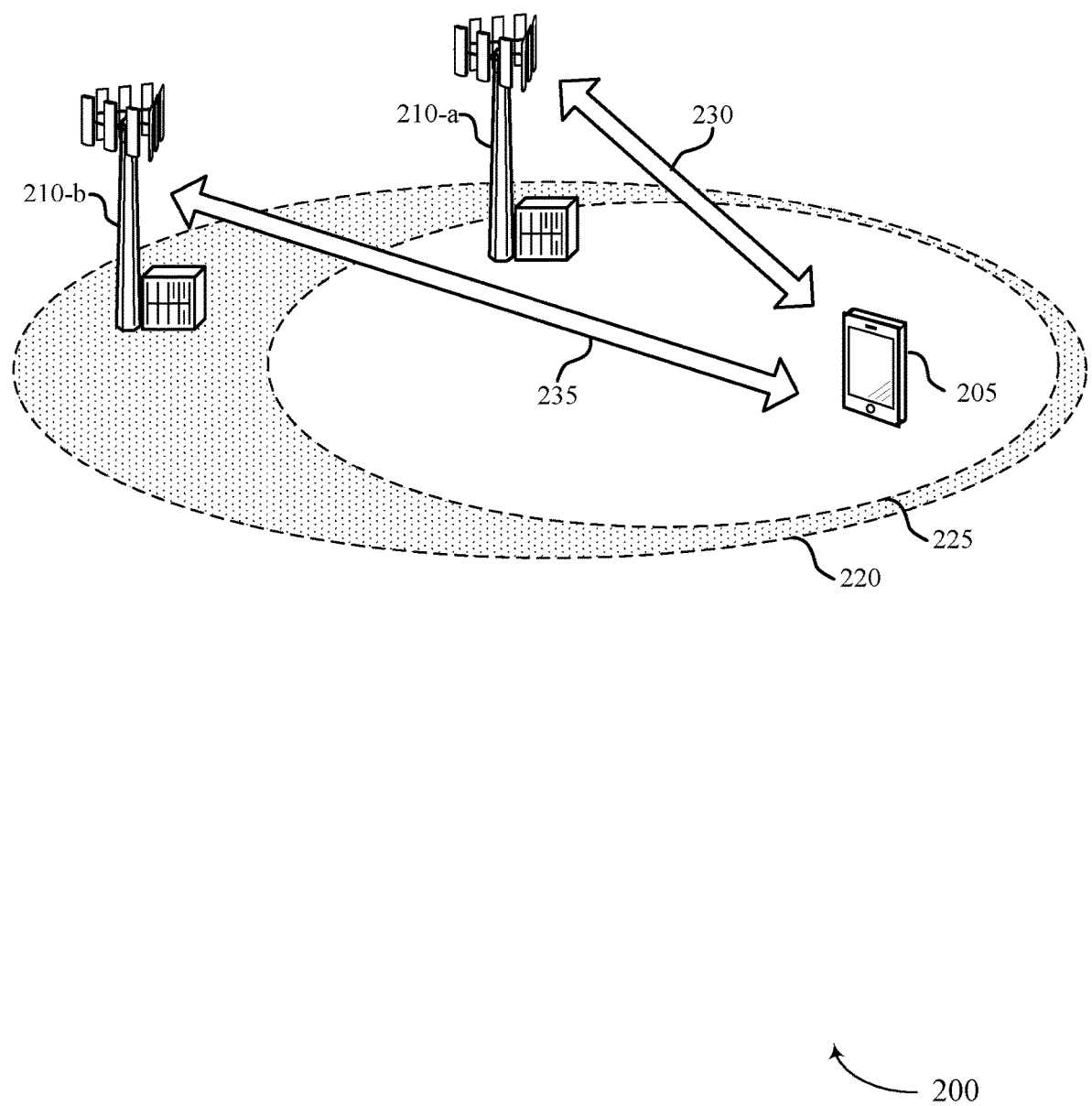
FIG. 2 illustrates an example of a wireless communications system 200 that supports techniques for DSS across RATs in accordance with various aspects of the present disclosure.

FIG. 2 illustrates an example of a wireless communications system 200 that supports techniques for DSS across RATs in accordance with various aspects of the present disclosure. For example, wireless communications system 200 may support DSS communications for wireless devices such as a UE 205 and network entities 210-a and 210-b, which may be examples of corresponding devices described with reference to FIG. 1.

Some wireless communications networks may support high frequency communications such as those signaled using a millimeter wave spectrum or higher frequencies such as a sub-THz spectrum (e.g., 5G/NR wireless communications networks or 6G wireless communications networks) using a first RAT 220. In some examples, lower frequency bands (e.g., radio frequency spectrum bands operating with frequencies lower than millimeter wave frequencies) may then be used to provide cellular coverage for devices that do not have a capability to support millimeter wave communications (e.g., LTE services). For example, the lower frequency bands may be used as an anchor for lower frequency channels, and may enable control and signaling information, and may be used to configure, add, modify, and release the connection for the first RAT 220. In such examples, the wireless communications network may implement techniques such as re-framing of radio frequency spectrum bands used for the different RATs, splitting resources between different RATs, dynamic resource allocation across the different RATs, and so on, to enable coexistence between the first and second RAT.

To support coexistence between different RATs (and for network transition between different RATs), the wireless communications system may implement dynamic spectrum sharing (DSS) techniques to enable devices associated with different RATs to perform wireless communications in the same radio frequency spectrum band, which may result in greater spectral efficiency, lower resource overhead, and more efficient utilization of communication resources. The UE 205 may support communications using multiple different RATs on a set of shared resources. For example, the UE 205 may implement DSS to enable two or more RATs to be simultaneously deployed within a single carrier, which may effectively increase operational efficiency and may support the transition from one RAT to another.

In some examples, network entity 210-*a*, 210-*b*, or both (serving the first RAT 220 225 and the second RAT 225, respectively) may coordinate scheduling to implement DSS. For example, for uplink communications, network entities 210-*a*, 210-*b*, or both, may schedule uplink communications from the UE 205 (and other devices in the wireless communications system 200) such that uplink channels do not collide. In some examples, the network may implement time synchronization between RATs via timing advance indication, for example, in cases that RATs are co-located on the same cell or at the same location (e.g., co-located sites). Additionally or alternatively, the network may support communications using frequency synchronization, for example, by applying a frequency shift (e.g., a 7.5 kHz frequency shift) to uplink communications on the first RAT 220 to align with uplink communications on the second RAT 225. In such examples, the time and frequency grid may be the same for both RATs.

In some other examples, for downlink communications, network entities 210-*a*, 210-*b*, or both, may perform time and frequency synchronization using global positioning service (GPS) timing and common, frequency reference, among other techniques. In some cases, the network may perform rate matching using multicast-broadcast single-frequency network (MBSFN) subframes (e.g., for NR SSB transmission with 15 kHz) and may avoid scheduling communications for the first RAT 220 around "always-on" signals for the second RAT 225 (e.g., primary synchronization signal (PSS), secondary synchronization signal (SSS), physical broadcast channel (PBCH) and cell reference signal (CRS)).

The air interface associated with the first RAT 220 (e.g., a 5G RAT) may be flexibly configured to support compatibility with other RATs. For example, to support coexistence with other RATs, the first RAT 220 may support resource element-level rate-matching patterns to allow for efficient multiplexing of different channels. In some implementations, other RATs (e.g., such as a 6G RAT) may support rate-matching techniques that are consistent with the first RAT 220, such that channels associated with the first RAT 220 and the second RAT 225 may be efficiently multiplexed for both downlink and uplink communications (e.g., in cases that coordination across the two RATs is implemented by the network).

The first RAT 220 may also support various different services, (e.g., eMBB and URLLC), which are visible to the PHY layer via a priority flag (e.g., eMBB is low priority and URLLC is high priority). Then, to multiplex different services of the first RAT 220 (e.g., channels of different priority), the first RAT 220 may use different indicators such as a downlink preemption indication (DLPI), uplink cancellation indication (ULCI), slot format indication (SFI), or a power control indicator. These indicators may allow the UE 205 to determine whether downlink communications are preempted (e.g., by a different service), whether uplink communications are to be preempted (e.g., by a different service), or whether the UE is to determine or modify a slot format or stop transmissions or reception based on the signaling.

These various indicators may allow the first RAT 220 flexibility to multiplex different services across different UEs as well as within the same UE. Additionally or alternatively, the indicators may allow for dynamic scheduling and may have a different action time relative to other data scheduling timelines. For example, ULCI may be sent to the UE 205 for uplink cancellation after the UE 205 is scheduled to transmit uplink data.

Wireless communications system 200 may implement a number of DSS techniques to support coexistence between the first RAT 220 and the second RAT 225. When sharing the same set of resources, the different RATs (e.g., 5G and 6G) may coordinate their scheduling decisions using dynamic scheduling indications provided for the first RAT 220 and the second RAT 225 (such as preemption indicators, slot format indicators, cancellation indicators, power control indicators). These dynamic scheduling indications may be coordinated between the two RATs so that the UE 205 identify communications 230 and 235 to receive or transmit on the first RAT 220 and the second RAT 225. For example, the UE 205 operating on the first RAT 220 may detect, decode, and apply one or more dynamic indications received for the second RAT 225 (or vice versa) on a set of resources shared by both RATs. Additionally or alternatively, the UE 205 may support DSS between the first RAT 220 and the second RAT 225 by applying different multiplexing schemes (such as FDM, TDM, SDM) for transmitting communications on different RATs, and by implementing one or more antenna sharing techniques between RATs to further support coexistence.

Figure 3:
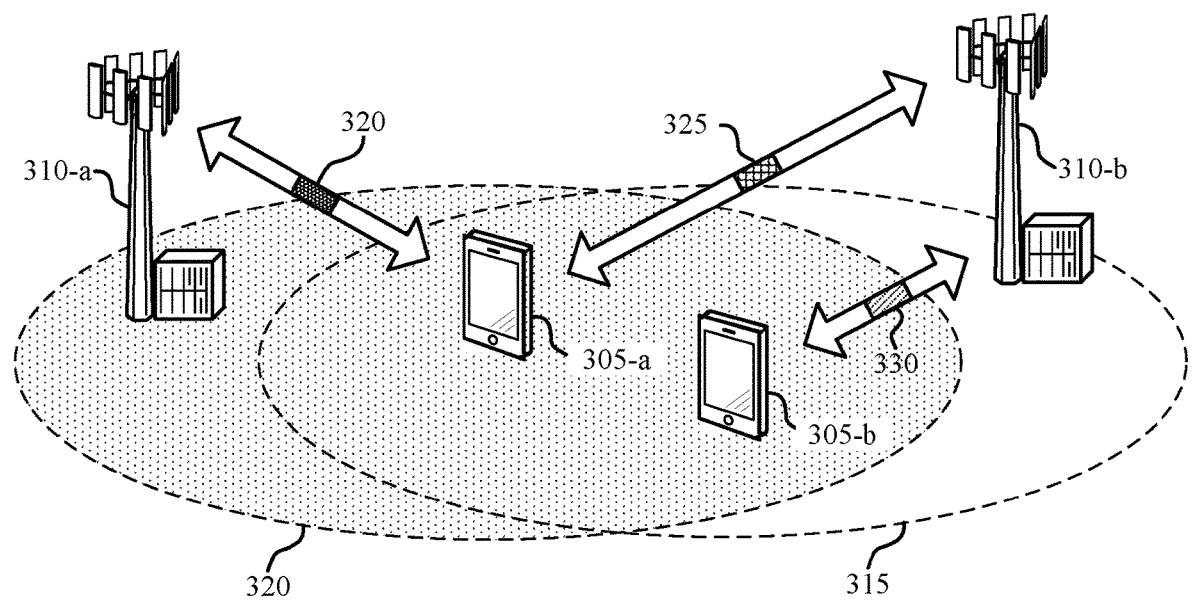
FIG. 3 illustrates an example of a wireless communications system 300 that supports techniques for DSS across RATs in accordance with various aspects of the present disclosure.

FIG. 3 illustrates an example of a wireless communications system 300 that supports techniques for DSS across RATs in accordance with various aspects of the present disclosure. For example, wireless communications system 200 may support DSS communications for wireless devices such as a UE 305-*a* and 305-*b* and network entities 310-*a* and 310-*b*, which may be examples of corresponding devices described with reference to FIGS. 1 and 2.

Wireless communications system 300 may support communications for users a first RAT 315 (served by network entity 310-*a*) and a second RAT 320 (served by network entity 310-*b*). The UEs 305-*a* and 305-*b* may communicate using one or more RATs on a set of shared resources. The wireless communications system 300 may implement DSS techniques to support the coexistence of the first RAT and the second RAT in the same radio frequency spectrum band.

For example, when sharing the same set of resources, the different RATs may coordinate scheduling decisions using dynamic scheduling indications provided for the first RAT and the second RAT (e.g., preemption indicators, slot format indicators, power control indicators, cancellation indicators indicated by control signaling). Such coordination may allow the UEs 305-*a* and 305-*b* to identify which communications they are to transmit or receive on each RAT. For example, a UE 305-*a* (operating using the first RAT) can determine how to detect, decode, and apply these dynamic indications received for the second RAT on a set of resources shared by both the first RAT and the second RAT. In some cases, these indications may be per-RAT indications or cross RAT indications (e.g., power saving/WUS, DRX, activation and de-activation signals).

In some examples, the first RAT and the second RAT (e.g., a 5G RAT and a 6G RAT) may have separate indications for the shared set of resources. For example, UEs operating using the first RAT (e.g., 5G users, UE 305-*b*) may follow the indications 330 of the first RAT (e.g., uplink CI for the first RAT, 5G uplink CI) and UEs operating using the second RAT (e.g., 6G users, UE 305-*a*) may follow the indications 325 of the second RAT (e.g., uplink CI for the second RAT, 6G uplink CI). In such examples, if the network entity 310-*a* (e.g., a 6G scheduler) schedules URLLC on set of resources that the network entity 310-*b* (e.g., a 5G scheduler) has allocated for eMBB, then network entity 310-*b* may transmit uplink CI to the UE 305-*b* notifying the UE 305-*b* to not use the resources for eMBB. In some examples, the channelization of the indications associated with the second RAT may be based on the indications associated with the first RAT, or may be different.

In some other examples, users operating using the second RAT (e.g., 6G users, UE 305-*a*) may receive the indications 325 associated with the first RAT (e.g., 5G indications) using the channels allocated for the first RAT. In such cases, the UE 305-*a* may coordinate with the network decisions of the first RAT and the second RAT. Additionally or alternatively, the second RAT may have an additional set of indications that may be received by users operating using the second RAT. In such examples, the behavior of the UE 305-*a* (e.g., a 6G user) may be the same or different from that of UE 305-*b* (e.g., a 5G user) when receiving the indications associated with the first RAT on the set of shared resources.

In some examples, users operating using the first RAT may cancel their transmissions when receiving ULCI, and users operating using the second RAT may cancel the transmission or reduce transmit power instead or transmit with a different beam. For example, users operating using the first RAT may apply ULCI to some uplink channels (e.g., physical uplink shared channel (PUSCH)) using a determined priority level. Users operating using the second RAT may apply the ULCI to the same set of channels and priorities or may separately be indicated which channels and what priority the ULCI associated with the first RAT may be applied to. In some cases, operations using the second RAT may cancel control signaling such as a physical uplink control channel (PUCCH) or may apply different priority rules.

The UEs 305-*a* and 305-*b* may in some cases receive conflicting indications associated with the first RAT and the second RAT. In such cases, the UEs 305-*a* and 305-*b* may apply one or more conflict resolution rules to determine which indicators to apply. For example, a rule may be based on the RAT itself, (e.g., indications of the second RAT take precedence over indications of the first RAT, or vice versa). In some other examples, the priority rules may be based on channel type (e.g., PUCCH is prioritized over PUSCH regardless of the RAT), based on contents of the messages being sent or contents of the indicators, based on PHY priorities, based on use case (e.g., in the context of sounding reference signal (SRS) transmission), or any combination thereof. For example, a UE may apply indictors based on RAT and priority where URLLC associated with the second RAT is prioritized over URLLC associated with the first RAT, which is prioritized over eMBB associated with the second RAT, which is prioritized over eMBB associated with the first RAT (e.g., in terms or priority, 6G URLLC>5G URLLC>6G eMBB>5G eMBB).

Figure 4:
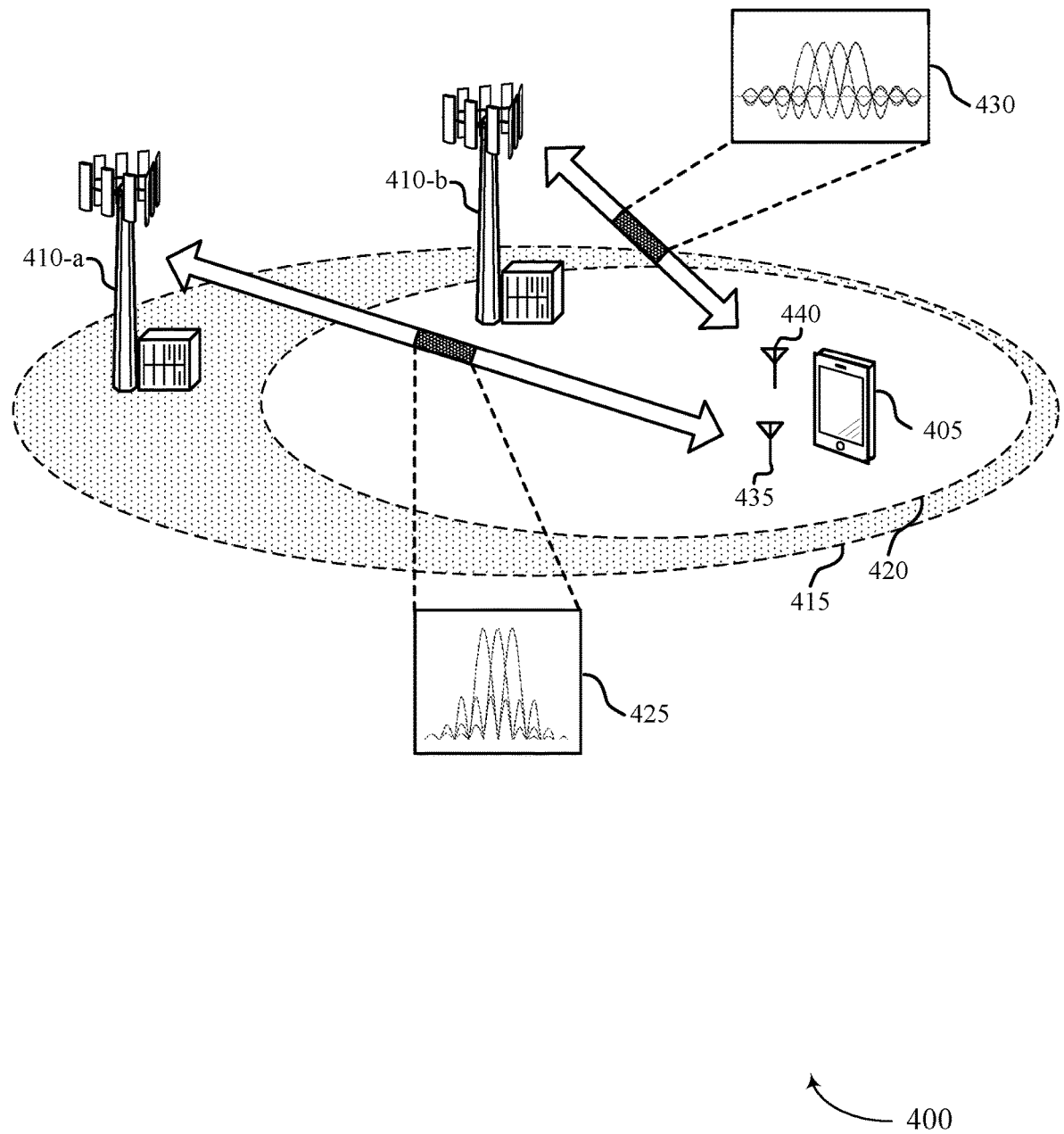
FIG. 4 illustrates an example of a wireless communications system 400 that supports techniques for DSS across RATs in accordance with various aspects of the present disclosure.

FIG. 4 illustrates an example of a wireless communications system 400 that supports techniques for DSS across RATs in accordance with various aspects of the present disclosure. For example, wireless communications system 400 may support DSS communications for wireless devices such as a UE 405 and network entities 410-*a* and 410-*b*, which may be examples of corresponding devices described with reference to FIGS. 1 through 3.

Wireless communications system 400 may support communications for users a first RAT 415 (served by network entity 410-*a*) and a second RAT 420 (served by network entity 410-*b*). The UEs 405 may communicate using one or more RATs on a set of shared resources associated with the first RAT and the second RAT. The UE 405 may implement DSS techniques to support the coexistence of the first RAT and the second RAT in the same radio frequency spectrum band. In some cases, the wireless communications system 400 may support a non-standalone (NSA) deployment for the UE 405, and may support communications with the UE using the first RAT and the second RAT in the same radio frequency spectrum band. In such cases, connection using the first RAT may be used for cyclic prefix (CP) signaling. In some cases, the scheduling of communications for the UE 405 may be based on O-RAN structure, for example, scheduling performed by a common scheduler associated with the first RAT and the second RAT or may be performed by independent but coordinated schedulers.

The UE 405 may implement different multiplexing modes such as TDM, FDM or SDM to support the air interface for both the first RAT and the second RAT. In some example, the multiplexing mode (e.g., TDM, FDM, SDM) may be based on the UE capability (e.g., all UEs support TDM based on capability, while some other UEs support FDM or SDM as an optional capability). In some other examples, the multiplexing mode could be dependent on the waveform. For example, the UE 405 may support FDM when both the first RAT and the second RAT use DFT-s-OFDM, CP-OFDM, or both. In some examples, the UE may support different multiplexing modes for different waveforms 425 and 430, which may be associated with the first RAT and the second RAT. In some other examples, some multiplexing modes may not be supported for some combination of waveforms associated with the first RAT and the second RAT. In some implementations, the multiplexing mode may be use case dependent. For example, the UE 405 may use FDM or SDM for data transmissions associated with the first RAT and the second RAT, and may use the same or different multiplexing modes for the combination of data transmissions and sensing/positioning transmissions.

Additionally or alternatively, the UE 405 may implement antenna sharing techniques to support DSS for different antenna RATs. For FDM and SDM modes, the UE 405 may share its antennas 435 and 440 across the first RAT and the second RAT. For example, the UE 405 may use some antennas for transmission of signals associated with the first RAT, and the UE 405 may use different antennas for the transmission of signals associated with the second RAT. In some cases, the UE 405 may transmit capability signaling to indicate how many uplink ports or layers it supports for the first RAT, for the second RAT, and for the combination of the first RAT and the second RAT (e.g., for FDM and SDM). In some implementations, antenna sharing may be supported for the UE 405 operating across different carriers (e.g., intra-band carriers) where the UE 405 is configured with the first RAT on a set of carriers and with the second RAT on another set of carriers. In some examples, the UE 405 may apply quasi-colocation information for a first set of antennas associated with the first RAT to a second set of antennas associated with the second RAT, or may derive a quasi-colocation (QCL) relationship for the second RAT based on a QCL relationship of the first RAT.

The UE 405 may receive scheduling that is aligned with UE capability, but may apply one or more different priority rules in cases that it receives conflicting scheduling. For example, the priority rules may be based on the RAT itself, (e.g., the second RAT takes precedence over the first RAT, or vice versa). In some other examples, the priority rules may be based on channel type (e.g., PUCCH is prioritized over PUSCH regardless of the RAT), based on contents of the messages being sent or contents, based on PHY priorities, based on use case (e.g., in the context of SRS transmission), or any combination thereof.

Additionally or alternatively, the UE 405 may re-use uplink channels across RATs if both the first RAT and the second RAT are supported for the UE 405 on the shared resources. For example, the first RAT may support different SRS use cases (e.g., CB-PUSCH, non-CB PUSH, antenna switching, positioning and beam management), which may also be supported by the second RAT. In such examples, the UE 405 may not transmit SRS associated with the first RAT in one use case and then SRS associated with the second RAT for the same use case, but instead may use a single SRS configuration shared across the first RAT and the second RAT. In some other cases, if there are use cases that are used on one RAT and not the other, the UE 405 may configure and implement SRS separately for these different use cases. In some examples, if some channels are reused across RATs (e.g., for SRS) the transmission and reception may be triggered by one RAT or by both RATs.

In some examples, antenna sharing for the UE 405 may be associated with various antenna sharing and dropping rules for DSS. For example, the antennas 435 and 440 may be associated with a same component carrier and a same radio frequency spectrum band. In some examples (e.g., for MIMO implementations), the UE 405 may drop a number of layers to support communications on the first RAT or the second RAT. The UE may indicate its transmission rank (e.g., precoding matrix indicator (PMI), modulation and coding scheme (MCS), transport block size (TBS), etc.) in uplink control information (UCI) in cases that antenna sharing is performed for multi-RAT transmissions. For example, in some cases the UE 405 may drop one transmission, and may use more antennas for another transmission (e.g., another transmission associated with the other RAT). In some cases, the UE 405 may indicate (e.g., as part of the uplink transmission) the actual number of layers used for the transmission to the corresponding RAT.

The UE 405 may support uplink antenna sharing in the same carrier using the different multiplexing modes. For example, the UE 405 may use TDM in different slots for the first RAT and the second RAT. The UE 405 may use FDM on both the first RAT and the second RAT on the same antennas on the same resource block or on different resource blocks. The UE 405 may implement SDM in cases that the precoder for the first RAT and the second RAT are associated with different layers for uplink MIMO.

Figure 5:
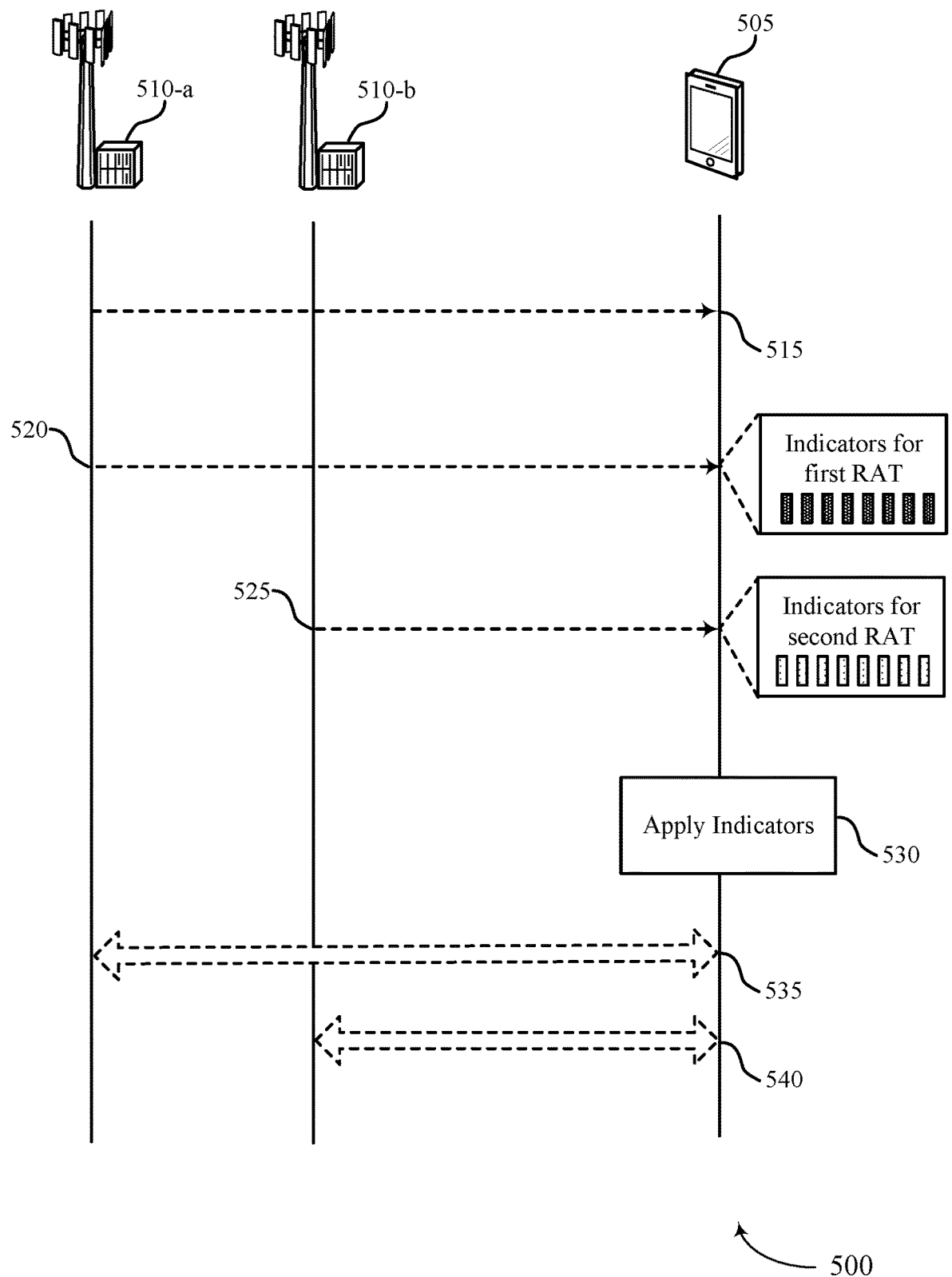
FIG. 5 illustrates an example of a process flow that supports techniques for DSS across RATs in accordance with various aspects of the present disclosure.

FIG. 5 illustrates an example of a process flow 500 that supports techniques for DSS across RATs in accordance with various aspects of the present disclosure. Process flow 500 may illustrate communications between a first device 505 (e.g., a UE), a second device 510-*a*, and a third device 510-*b*, each of which may be examples of devices (e.g., UEs, network entities) described herein. In the following description of the process flow 500, the operations between the first device 505, the second device 510-*a*, and the third device 510-*b* may be communicated in a different order than the example order shown, or the operations performed by the first device 505, the second device 510-*a*, and the third device 510-*b* may be performed in different orders or at different times. Some operations may also be omitted from the process flow 500, and other operations may be added to the process flow 500.

At 515, the first device 505 may receive, using a set of resources that are shared between a first RAT and a second RAT, control signaling indicating a DSS configuration for a channel shared between the first RAT and the second RAT. In some examples, the first RAT may be associated with a first subcarrier spacing and the second RAT may be associated with a second subcarrier spacing that is different from the first subcarrier spacing (e.g., mixed numerology). For example, in some cases the first RAT may be a 5G RAT and the second RAT may be a 6G RAT, although different RATs are possible.

At 520 and 525, the first device 505 may receive, from at least one of the first device 510-*a*, the second device 510-*b*, or both, one or more indicators to coordinate communications for the set of shared resources, the one or more indicators being associated with the first RAT, the second RAT, or both. In some examples, the first set of indicators (e.g., at 520) may be associated with the first RAT and the second set of indicators (e.g., at 525) may be associated with the second RAT. The one or more indicators may include one or more preemption indications, one or more cancellation indications, one or more slot format indications, power control indicators, or any combination thereof.

At 530, the UE may apply the first set of indicators during communications associated with the first RAT, and may apply the second set of indicators during communications associated with the second RAT. In some examples, the first device 505 may receive (e.g., while operating in accordance with the second RAT) a first set of indicators of the one or more indicators associated with the first RAT using a channel that is associated with the first RAT. The first device 505 may apply the first set of indicators to coordinate the one or more scheduled communications for the first RAT and the second RAT based on the DSS configuration.

At 535 and 540, the first device 505 may communicate using one or more scheduled communications associated with the first RAT or the second RAT using the shared data channel based on applying the one or more indicators to the one or more scheduled communications.

In some examples, the first device 505 may receive (e.g., while operating in accordance with the second RAT) a second set of indicators of the one or more indicators associated with the second RAT. The first device 505 may apply the second set of indicators to coordinate the one or more scheduled communications for the first RAT and the second RAT based on the DSS configuration.

In some examples, the first device 505 may receive a first indicator that conflicts with at least a second indicator. Based on the conflict, the first device 505 may apply a set of priority rules (e.g., RAT type, channel type, information type, scheduling type, physical channel properties, channel use case, or any combination thereof) to determine whether to apply the first indicator or the second indicator.

Figure 6:
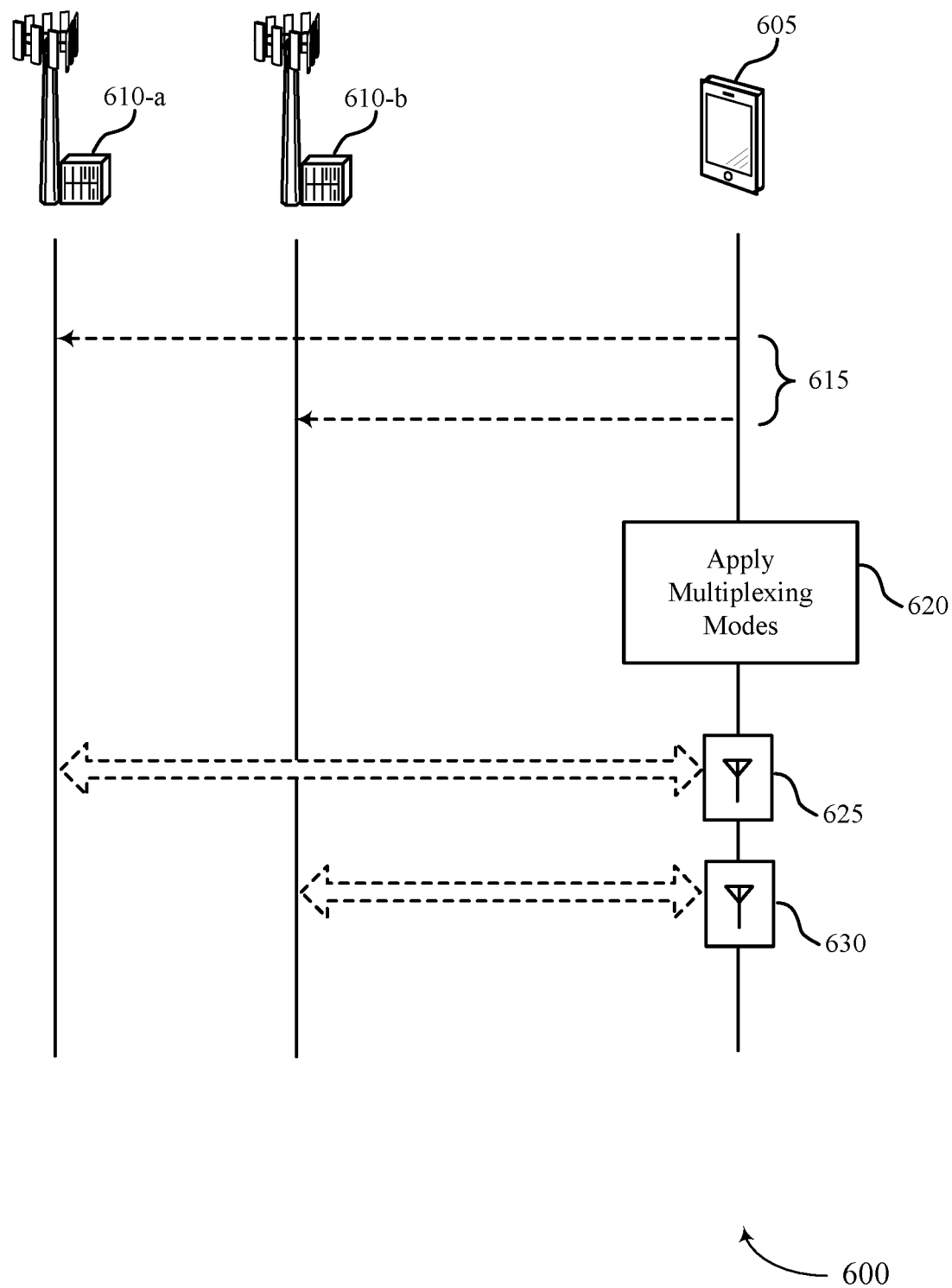
FIG. 6 illustrates an example of a process flow that supports techniques for DSS across RATs in accordance with various aspects of the present disclosure

FIG. 6 illustrates an example of a process flow 600 that supports techniques for DSS across RATs in accordance with various aspects of the present disclosure. Process flow 600 may illustrate communications between a first device 605, a second device 610-a, and a third device 610-b, each of which may be examples of devices (e.g., UEs, network entities) described herein. In the following description of the process flow 600, the operations between the first device 605 (e.g., a first device 605), the second device 610-a, and the third device 610-b may be communicated in a different order than the example order shown, or the operations performed by the first device 605, the second device 610-a, and the third device 610-b may be performed in different orders or at different times. Some operations may also be omitted from the process flow 600, and other operations may be added to the process flow 600.

At 615, the first device 605 may transmit a message that includes an indication of DSS for a set of resources that are shared between a first RAT (e.g., served by the second device 610-a) and a second RAT (e.g., served by the third device 610-b). In some examples, the first RAT may be associated with a first subcarrier spacing and the second RAT may be associated with a second subcarrier spacing that is different from the first subcarrier spacing (e.g., mixed numerology). For example, in some cases the first RAT may be a 5G RAT and the second RAT may be a 6G RAT, although different RATs are possible.

At 620, the first device 605 may apply (e.g., based on the UE capability) one or more multiplexing modes to communications associated with the first RAT and the second RAT using the set of shared resources. In some cases, the one or more multiplexing modes may include a TDM multiplexing mode, an FDM multiplexing mode, an SDM mode, or any combination thereof.

In some examples, the first RAT may be associated with a first waveform (e.g., a first OFDM waveform) and the second RAT may be associated with a second waveform (e.g., a second OFDM waveform), and the first device 605 may apply the one or more multiplexing modes (e.g., TDM, FDM, SDM) based on the first waveform and the second waveform. In some examples, the first device 605 may apply the one or more multiplexing modes based on a type of communications associated with the first RAT and the second RAT. For example, the multiplexing mode may be case dependent (e.g., FDM and SDM may be supported for data transmissions but not for sensing and positioning transmissions).

At 625 and 630, the first device 605 may communicate using the first RAT and the second RAT using the shared resources and based on applying the one or more multiplexing modes. At 625, the first device 605 may communicate a first set of signals associated with the first RAT using a first set of antennas and at 630 the first device 605 may communicate a second set of signals associated with the second RAT using a second set of antennas, where the first set of antennas are different from the second set of antennas based on the one or more multiplexing modes. In some examples, the first set of signals associated with the first RAT are associated with a first set of carriers and the second set of signals associated with the second RAT are associated with a second set of carriers. In some examples, the UE capability indicates a first number of antenna ports supported for the first RAT, a second number of antenna ports supported for the second RAT, or a third number of antenna ports supported for both the first RAT and the second RAT.

Figure 7:
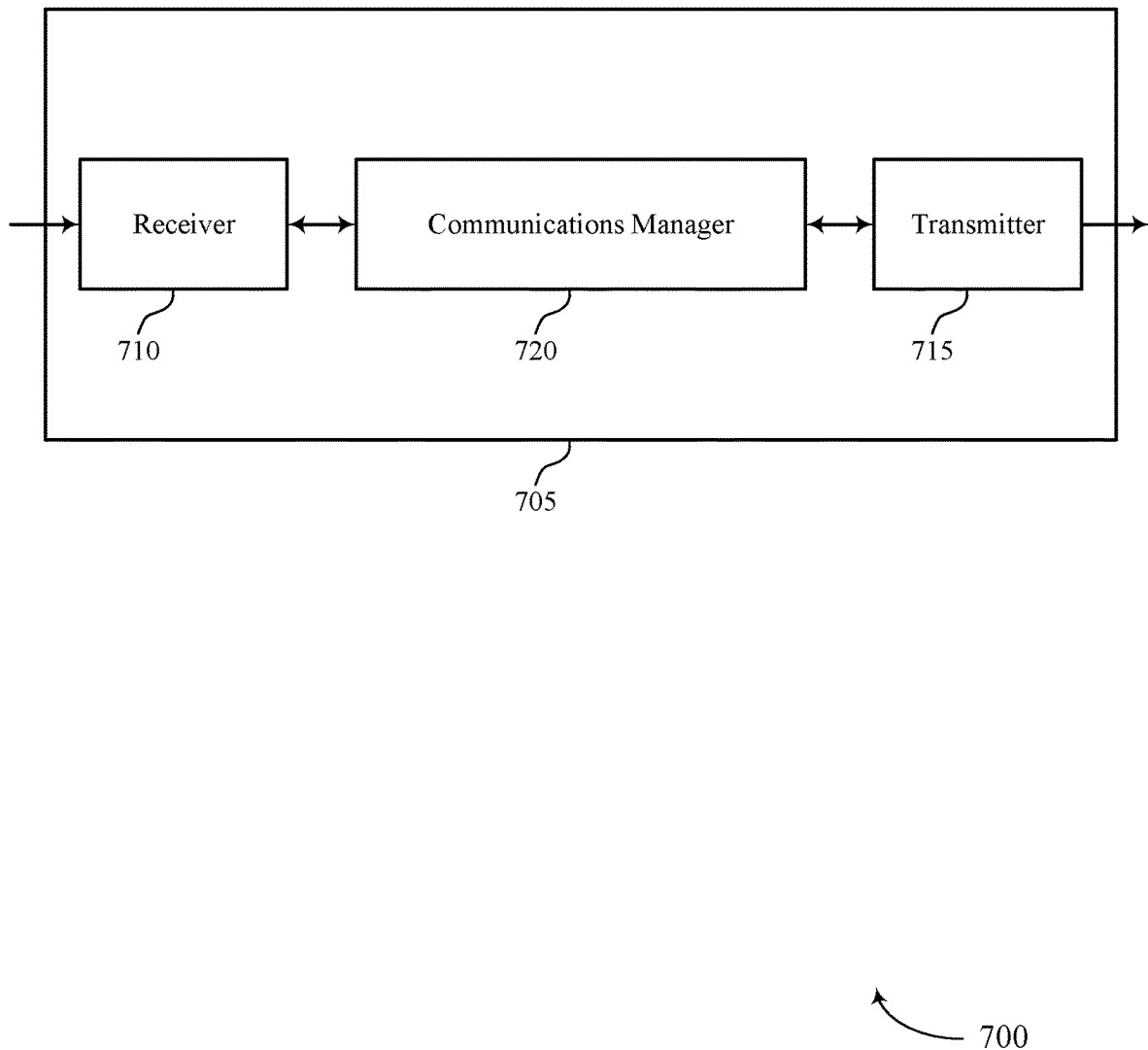
FIGS. 7 and 8 show block diagrams of devices that support techniques for DSS across RATs in accordance with various aspects of the present disclosure.

FIG. 7 shows a block diagram 700 of a device 705 that supports techniques for DSS across RATs in accordance with various aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for DSS across RATs). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for DSS across RATs). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for DSS across RATs as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. For example, the communications manager 720 may be configured as or otherwise support a means for receiving, using a set of resources that are shared between a first RAT and a second RAT, control signaling indicating a DSS configuration for a channel shared between the RAT and the second RAT. The communications manager 720 may be configured as or otherwise support a means for receiving, based on the DSS configuration, one or more indicators to coordinate communications for the set of resources, the one or more indicators being associated with the first RAT, the second RAT, or both. The communications manager 720 may be configured as or otherwise support a means for communicating one or more scheduled communications associated with the first RAT or the second RAT using the data channel based on applying the one or more indicators to the one or more scheduled communications.

Additionally, or alternatively, the communications manager 720 may support wireless communication at a UE in accordance with examples as disclosed herein. For example, the communications manager 720 may be configured as or otherwise support a means for transmitting a message that includes an indication of a UE capability to support DSS for a set of resources that are shared between a first RAT and a second RAT. The communications manager 720 may be configured as or otherwise support a means for applying, in accordance with the UE capability, one or more multiplexing modes to communications associated with the first RAT and the second RAT using the set of resources. The communications manager 720 may be configured as or otherwise support a means for communicating using the first RAT and the second RAT using the set of resources based on applying the one or more multiplexing modes.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for increased spectral efficiency, and more efficient utilization of available communication resources.

Figure 8:
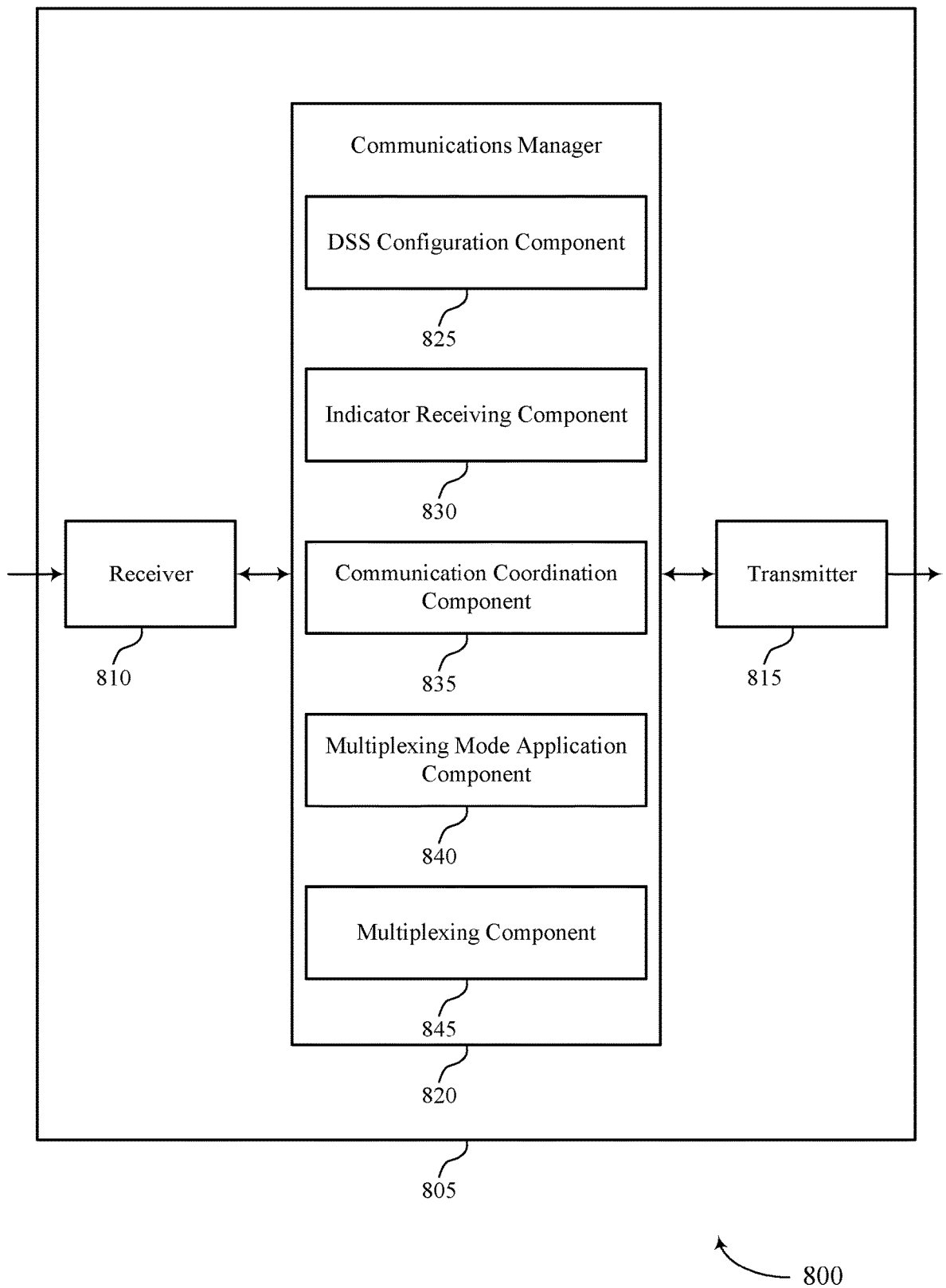

FIG. 8 shows a block diagram 800 of a device 805 that supports techniques for DSS across RATs in accordance with various aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for DSS across RATs). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for DSS across RATs). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for DSS across RATs as described herein. For example, the communications manager 820 may include a DSS configuration component 825, an indicator receiving component 830, a communication coordination component 835, a multiplexing mode application component 840, a multiplexing component 845, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. The DSS configuration component 825 may be configured as or otherwise support a means for receiving, using a set of resources that are shared between a first RAT and a second RAT, control signaling indicating a DS S configuration for a channel shared between the RAT and the second RAT. The indicator receiving component 830 may be configured as or otherwise support a means for receiving, based on the DSS configuration, one or more indicators to coordinate communications for the set of resources, the one or more indicators being associated with the first RAT, the second RAT, or both. The communication coordination component 835 may be configured as or otherwise support a means for communicating one or more scheduled communications associated with the first RAT or the second RAT using the data channel based on applying the one or more indicators to the one or more scheduled communications.

Additionally, or alternatively, the communications manager 820 may support wireless communication at a UE in accordance with examples as disclosed herein. The DSS configuration component 825 may be configured as or otherwise support a means for transmitting a message that includes an indication of DSS for a set of resources that are shared between a first RAT and a second RAT. The multiplexing mode application component 840 may be configured as or otherwise support a means for applying, in accordance with the UE capability, one or more multiplexing modes to communications associated with the first RAT and the second RAT using the set of resources. The multiplexing component 845 may be configured as or otherwise support a means for communicating using the first RAT and the second RAT using the set of resources based on applying the one or more multiplexing modes.

Figure 9:
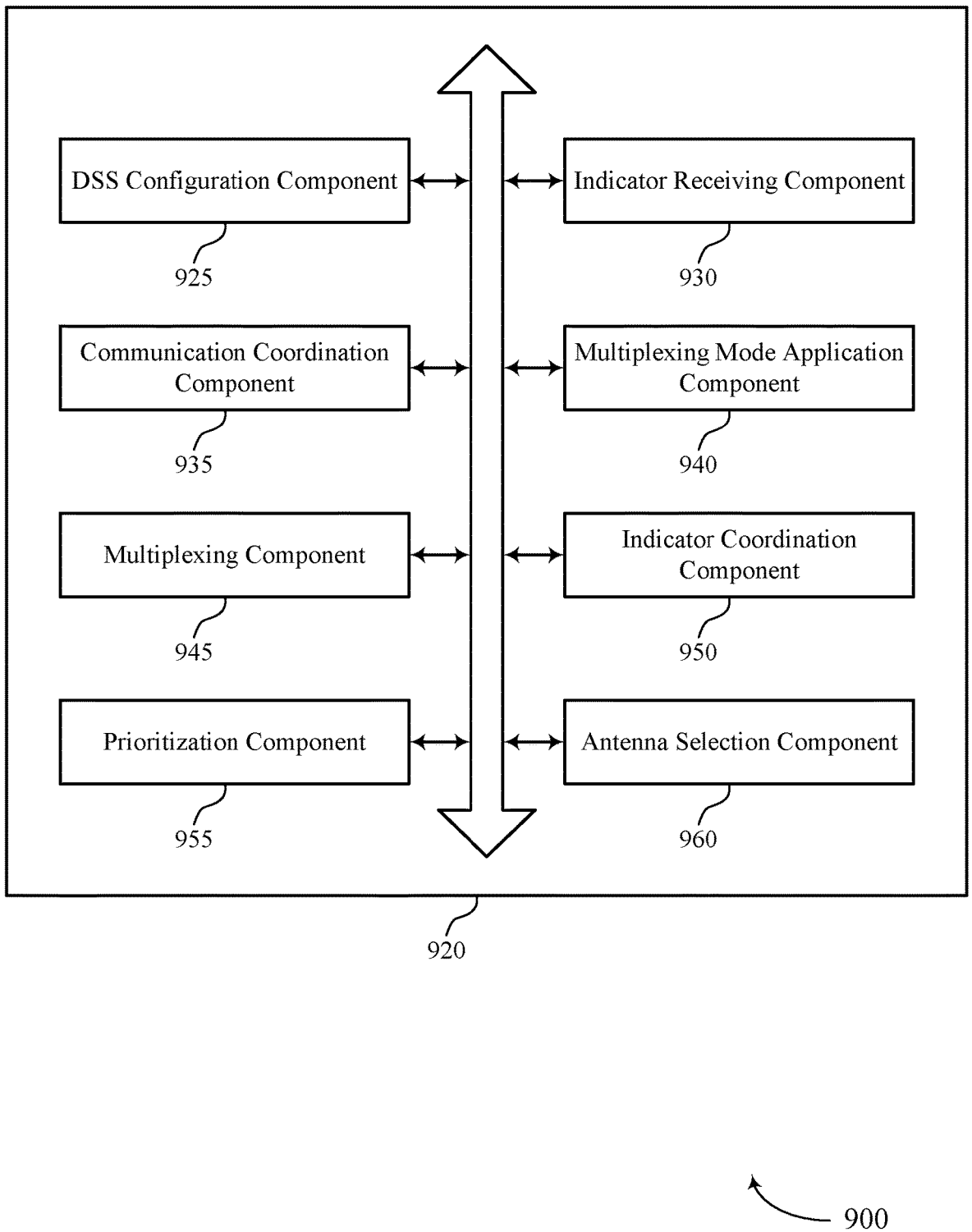
FIG. 9 shows a block diagram of a communications manager that supports techniques for DSS across RATs in accordance with various aspects of the present disclosure.

FIG. 9 shows a block diagram 900 of a communications manager 920 that supports techniques for DSS across RATs in accordance with various aspects of the present disclosure. The communications manager 920 may be an example of aspects of a communications manager 720, a communications manager 820, or both, as described herein. The communications manager 920, or various components thereof, may be an example of means for performing various aspects of techniques for DSS across RATs as described herein. For example, the communications manager 920 may include a DSS configuration component 925, an indicator receiving component 930, a communication coordination component 935, a multiplexing mode application component 940, a multiplexing component 945, an indicator coordination component 950, a prioritization component 955, an antenna selection component 960, or any combination thereof. Each of these components may communicate, directly or indirectly, with one another (e.g., via one or more buses).

The communications manager 920 may support wireless communication at a UE in accordance with examples as disclosed herein. The DSS configuration component 925 may be configured as or otherwise support a means for receiving, using a set of resources that are shared between a first RAT and a second RAT, control signaling indicating a DS S configuration for a channel shared between the RAT and the second RAT. The indicator receiving component 930 may be configured as or otherwise support a means for receiving, based on the DSS configuration, one or more indicators to coordinate communications for the set of resources, the one or more indicators being associated with the first RAT, the second RAT, or both. The communication coordination component 935 may be configured as or otherwise support a means for communicating one or more scheduled communications associated with the first RAT or the second RAT using the data channel based on applying the one or more indicators to the one or more scheduled communications.

In some examples, the one or more indicators include a first set of indicators associated with the first RAT and a second set of indicators associated with the second RAT, and the indicator coordination component 950 may be configured as or otherwise support a means for applying the first set of indicators during communications associated with the first RAT. In some examples, the one or more indicators include a first set of indicators associated with the first RAT and a second set of indicators associated with the second RAT, and the indicator coordination component 950 may be configured as or otherwise support a means for applying the second set of indicators during communications associated with the second RAT.

In some examples, to support receiving the one or more indicators, the indicator receiving component 930 may be configured as or otherwise support a means for receiving, while operating in accordance with the second RAT, a first set of indicators of the one or more indicators associated with the first RAT using a channel that is associated with the first RAT. In some examples, to support receiving the one or more indicators, the indicator coordination component 950 may be configured as or otherwise support a means for applying the first set of indicators to coordinate the one or more scheduled communications for the first RAT and the second RAT based on the DSS configuration.

In some examples, the indicator receiving component 930 may be configured as or otherwise support a means for receiving, while operating in accordance with the second RAT, a second set of indicators of the one or more indicators associated with the second RAT, the second set of indicators being different from the first set of indicators. In some examples, the indicator coordination component 950 may be configured as or otherwise support a means for applying the second set of indicators to coordinate the one or more scheduled communications for the first RAT and the second RAT based on the DSS configuration.

In some examples, to support receiving the one or more indicators, the indicator receiving component 930 may be configured as or otherwise support a means for receiving a first indicator that conflicts with at least a second indicator of the one or more indicators. In some examples, to support receiving the one or more indicators, the prioritization component 955 may be configured as or otherwise support a means for applying a set of priority rules based on the conflict. In some examples, to support receiving the one or more indicators, the prioritization component 955 may be configured as or otherwise support a means for applying the first indicator or the second indicator in accordance with the set of priority rules.

In some examples, the set of priority rules indicate a priority based on RAT type, channel type, information type, scheduling type, physical channel properties, channel use case, or any combination thereof.

In some examples, the one or more indicators include one or more preemption indications, one or more cancellation indications, one or more slot format indications, power control indicators, or any combination thereof.

In some examples, the first RAT associated with a first subcarrier spacing and the second RAT associated with a second subcarrier spacing that is different from the first subcarrier spacing.

In some examples, the first RAT includes a fifth generation (5G) RAT and the second RAT includes a sixth generation (6G) RAT.

Additionally, or alternatively, the communications manager 920 may support wireless communication at a UE in accordance with examples as disclosed herein. In some examples, the DSS configuration component 925 may be configured as or otherwise support a means for transmitting a message that includes an indication of a UE capability to support DSS for a set of resources that are shared between a first RAT and a second RAT. The multiplexing mode application component 940 may be configured as or otherwise support a means for applying, in accordance with the UE capability, one or more multiplexing modes to communications associated with the first RAT and the second RAT using the set of resources. The multiplexing component 945 may be configured as or otherwise support a means for communicating using the first RAT and the second RAT using the set of resources based on applying the one or more multiplexing modes.

In some examples, the multiplexing mode application component 940 may be configured as or otherwise support a means for applying the one or more multiplexing modes based on the UE capability, where the one or more multiplexing modes include a TDM mode, an FDM mode, an SDM mode, or any combination thereof.

In some examples, the first RAT is associated with a first waveform and the second RAT is associated with a second waveform, and the multiplexing mode application component 940 may be configured as or otherwise support a means for applying the one or more multiplexing modes based on the first waveform and the second waveform, where the one or more multiplexing modes include a TDM mode, a FDM mode, a SDM mode, or any combination thereof.

In some examples, the multiplexing mode application component 940 may be configured as or otherwise support a means for applying the one or more multiplexing modes based on a type of communications associated with the first RAT and the second RAT scheduled for the set of resources.

In some examples, the one or more multiplexing modes include a FDM mode, and the antenna selection component 960 may be configured as or otherwise support a means for communicating a first set of signals associated with the first RAT using a first set of antennas. In some examples, the one or more multiplexing modes include a FDM mode, and the antenna selection component 960 may be configured as or otherwise support a means for communicating a second set of signals associated with the second RAT using a second set of antennas, the first set of antennas being different from the second set of antennas based on the one or more multiplexing modes.

In some examples, the first set of signals associated with the first RAT are associated with a first set of carriers and the second set of signals associated with the second RAT are associated with a second set of carriers.

In some examples, the message that includes an indication of the UE capability further indicates a first number of antenna ports supported for the first RAT, a second number of antenna ports supported for the second RAT, or a third number of antenna ports supported for both the first RAT and the second RAT.

In some examples, the communication coordination component 935 may be configured as or otherwise support a means for transmitting a set of one or more channels using the set of resources in accordance with the UE capability, the set of one or more channels being common to the first RAT and the second RAT.

In some examples, the first RAT associated with a first subcarrier spacing and the second RAT associated with a second subcarrier spacing that is different from the first subcarrier spacing.

In some examples, the first RAT includes a fifth generation (5G) RAT and the second RAT includes a sixth generation (6G) RAT.

Figure 10:
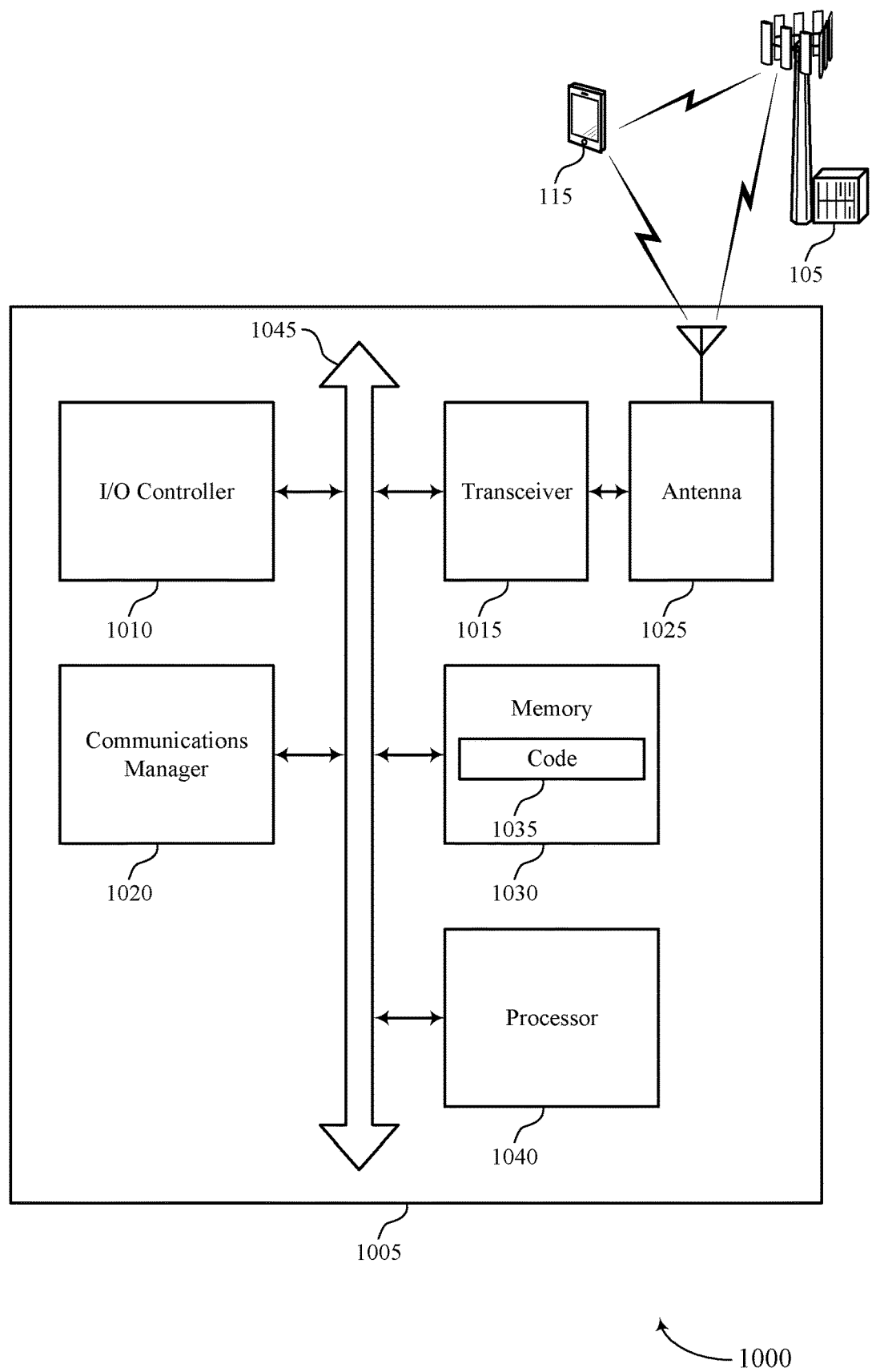
FIG. 10 shows a diagram of a system including a device that supports techniques for DSS across RATs in accordance with various aspects of the present disclosure.

FIG. 10 shows a diagram of a system 1000 including a device 1005 that supports techniques for DSS across RATs in accordance with various aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for DSS across RATs). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving, using a set of resources that are shared between a first RAT and a second RAT, control signaling indicating a DSS configuration for a channel shared between the RAT and the second RAT. The communications manager 1020 may be configured as or otherwise support a means for receiving, based on the DSS configuration, one or more indicators to coordinate communications for the set of resources, the one or more indicators being associated with the first RAT, the second RAT, or both. The communications manager 1020 may be configured as or otherwise support a means for communicating one or more scheduled communications associated with the first RAT or the second RAT using the data channel based on applying the one or more indicators to the one or more scheduled communications.

Additionally, or alternatively, the communications manager 1020 may support wireless communication at a UE in accordance with examples as disclosed herein. For example, the communications manager 1020 may be configured as or otherwise support a means for transmitting a message that includes an indication of a UE capability to support DSS for a set of resources that are shared between a first RAT and a second RAT. The communications manager 1020 may be configured as or otherwise support a means for applying, in accordance with the UE capability, one or more multiplexing modes to communications associated with the first RAT and the second RAT using the set of resources. The communications manager 1020 may be configured as or otherwise support a means for communicating using the first RAT and the second RAT using the set of resources based on applying the one or more multiplexing modes.

By including or configuring the communications manager 1020 in accordance with examples as described herein, the device 1005 may support techniques for improved communication reliability, more efficient utilization of communication resources, improved coordination between devices, reduced resource overhead, greater spectral efficiency, efficient transition between RATs, increased support for different UE capability in a wireless communications network.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for DSS across RATs as described herein, or the processor 1040 and the memory 1030 may be otherwise configured to perform or support such operations.

Figure 11:
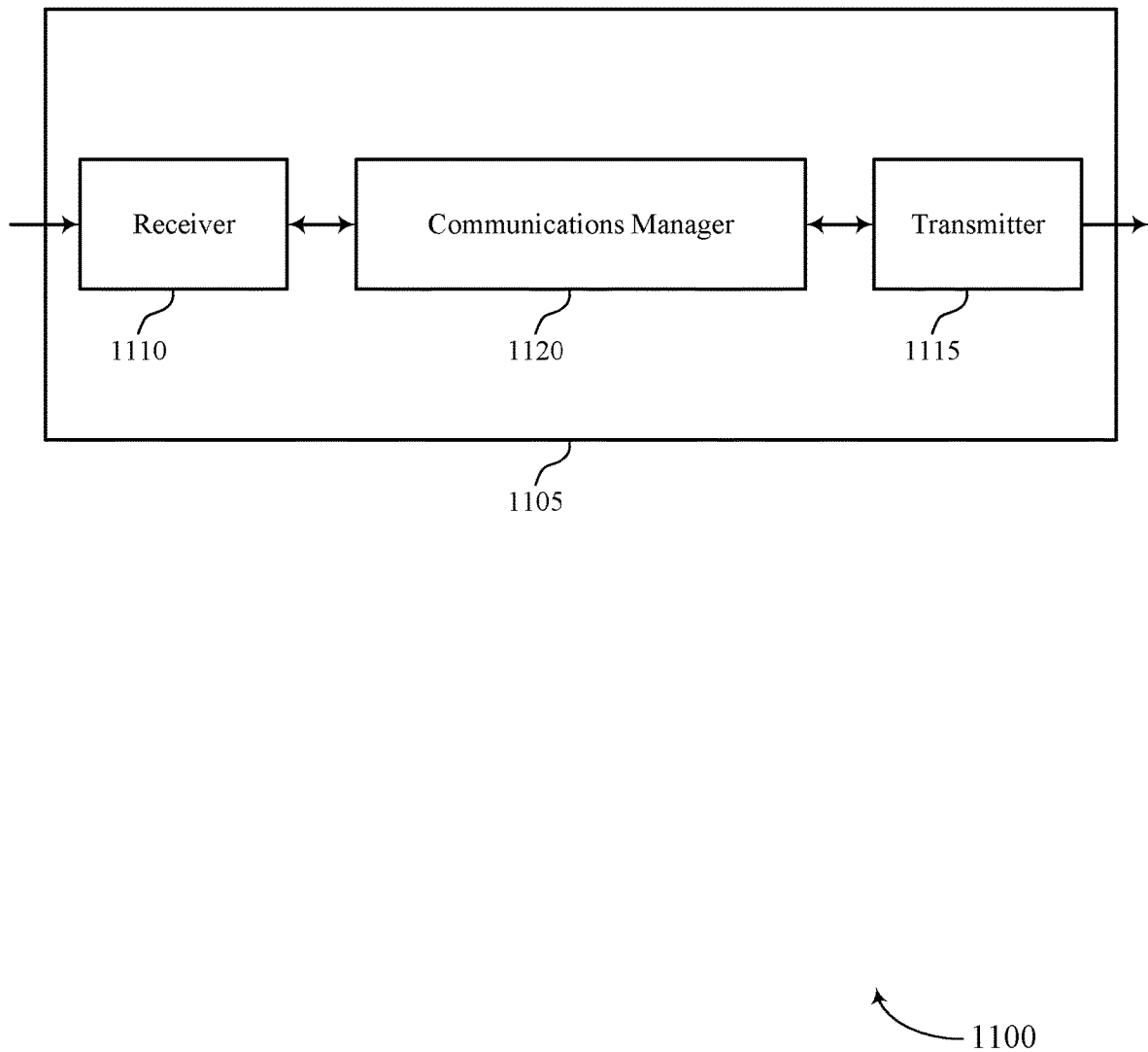
FIGS. 11 and 12 show block diagrams of devices that support techniques for DSS across RATs in accordance with various aspects of the present disclosure.

FIG. 11 shows a block diagram 1100 of a device 1105 that supports techniques for DSS across RATs in accordance with various aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of techniques for DSS across RATs as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. For example, the communications manager 1120 may be configured as or otherwise support a means for transmitting, using a set of resources that are shared between a first RAT and a second RAT supported by a UE, control signaling indicating a DSS configuration for a channel shared between the first RAT and the second RAT. The communications manager 1120 may be configured as or otherwise support a means for transmitting, to the UE, based on the DSS configuration, one or more indicators to coordinate communications using the set of resources, the one or more indicators being associated with the first RAT, the second RAT, or both. The communications manager 1120 may be configured as or otherwise support a means for communicating with the UE in accordance with the DSS configuration using the data channel based on the one or more indicators.

Additionally, or alternatively, the communications manager 1120 may support wireless communication at a network entity in accordance with examples as disclosed herein. For example, the communications manager 1120 may be configured as or otherwise support a means for receiving a message that includes an indication of a UE capability to support DSS using a set of resources shared between a first RAT and a second RAT. The communications manager 1120 may be configured as or otherwise support a means for communicating with a UE using one or more multiplexing modes associated with the first RAT and the second RAT using the set of resources.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for increased spectral efficiency, and more efficient utilization of available communication resources.

Figure 12:
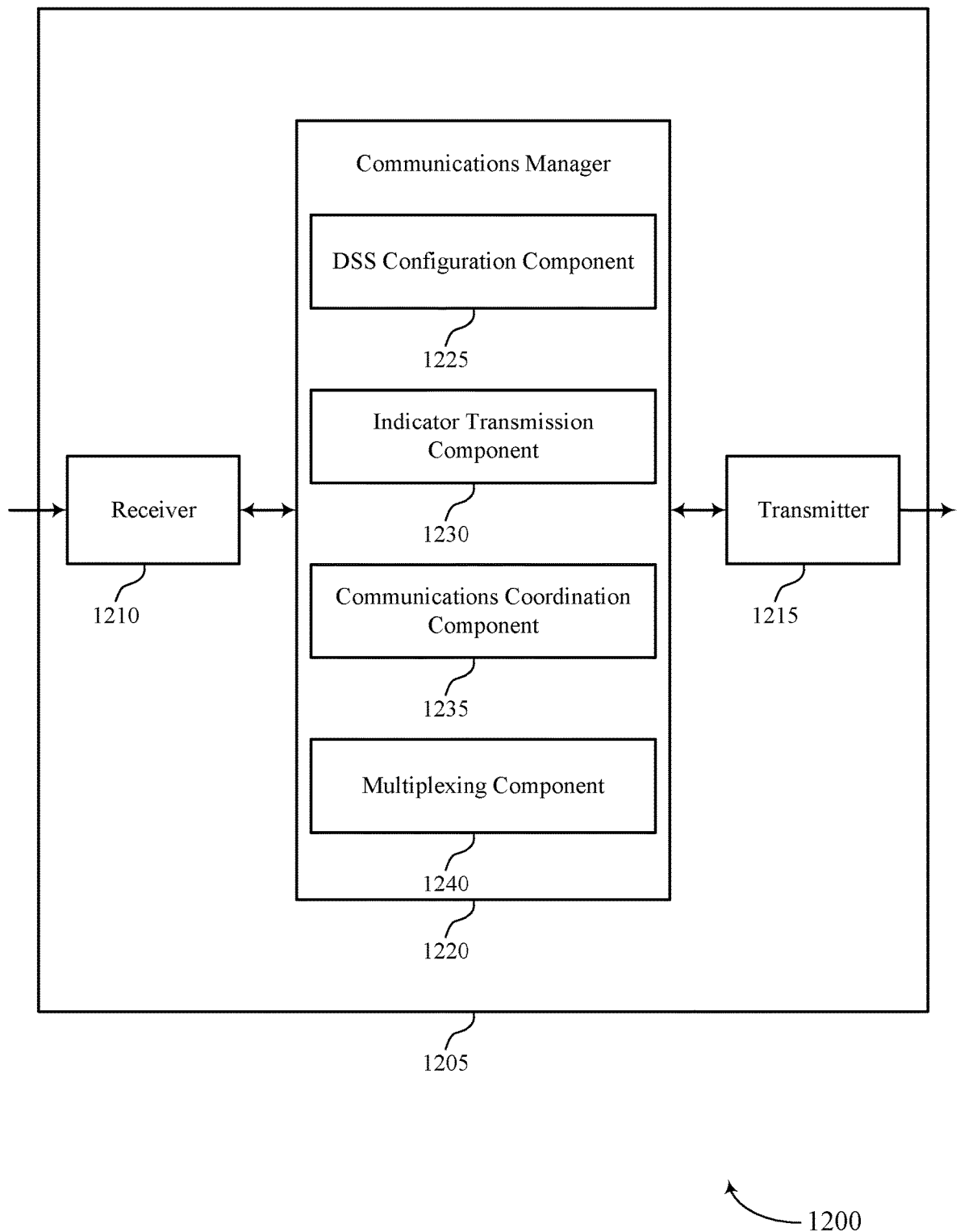

FIG. 12 shows a block diagram 1200 of a device 1205 that supports techniques for DSS across RATs in accordance with various aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of techniques for DSS across RATs as described herein. For example, the communications manager 1220 may include a DSS configuration component 1225, an indicator transmission component 1230, a communications coordination component 1235, a multiplexing component 1240, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. The DSS configuration component 1225 may be configured as or otherwise support a means for transmitting, using a set of resources that are shared between a first RAT and a second RAT supported by a UE, control signaling indicating a DSS configuration for a channel shared between the first RAT and the second RAT. The indicator transmission component 1230 may be configured as or otherwise support a means for transmitting, to the UE, based on the DSS configuration, one or more indicators to coordinate communications using the set of resources, the one or more indicators being associated with the first RAT, the second RAT, or both. The communications coordination component 1235 may be configured as or otherwise support a means for communicating with the UE in accordance with the DSS configuration using the data channel based on the one or more indicators.

Additionally, or alternatively, the communications manager 1220 may support wireless communication at a network entity in accordance with examples as disclosed herein. The DSS configuration component 1225 may be configured as or otherwise support a means for receiving a message that includes an indication of DSS using a set of resources shared between a first RAT and a second RAT. In some examples, the indication may include a UE capability to support DSS using the set of resources shared between the first RAT and the second RAT. The multiplexing component 1240 may be configured as or otherwise support a means for communicating with a UE using one or more multiplexing modes associated with the first RAT and the second RAT using the set of resources.

Figure 13:
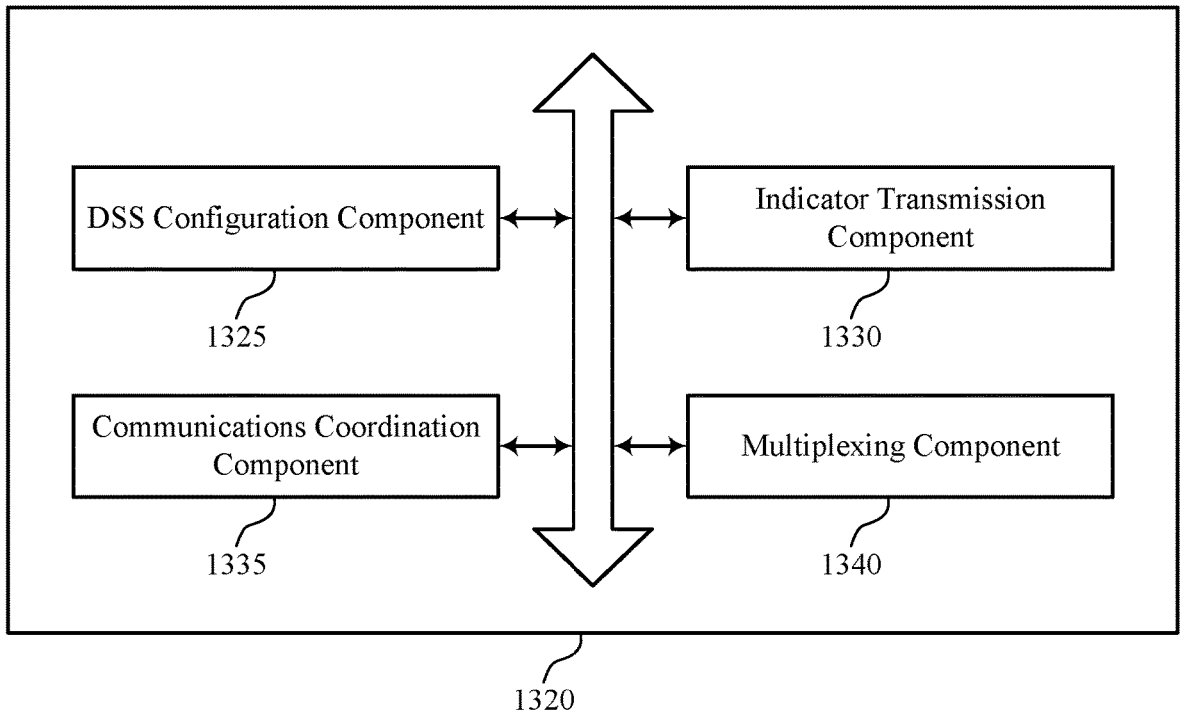
FIG. 13 shows a block diagram of a communications manager that supports techniques for DSS across RATs in accordance with various aspects of the present disclosure.

FIG. 13 shows a block diagram 1300 of a communications manager 1320 that supports techniques for DSS across RATs in accordance with various aspects of the present disclosure. The communications manager 1320 may be an example of aspects of a communications manager 1120, a communications manager 1220, or both, as described herein. The communications manager 1320, or various components thereof, may be an example of means for performing various aspects of techniques for DSS across RATs as described herein. For example, the communications manager 1320 may include a DSS configuration component 1325, an indicator transmission component 1330, a communications coordination component 1335, a multiplexing component 1340, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication at a network entity in accordance with examples as disclosed herein. The DSS configuration component 1325 may be configured as or otherwise support a means for transmitting, using a set of resources that are shared between a first RAT and a second RAT supported by a UE, control signaling indicating a DSS configuration for a channel shared between the first RAT and the second RAT. The indicator transmission component 1330 may be configured as or otherwise support a means for transmitting, to the UE, based on the DSS configuration, one or more indicators to coordinate communications using the set of resources, the one or more indicators being associated with the first RAT, the second RAT, or both. The communications coordination component 1335 may be configured as or otherwise support a means for communicating with the UE in accordance with the DSS configuration using the data channel based on the one or more indicators.

In some examples, the one or more indicators include a first set of indicators applicable to communications associated with the first RAT and a second set of indicators applicable to communications associated with the second RAT.

In some examples, to support receiving the one or more indicators, the indicator transmission component 1330 may be configured as or otherwise support a means for transmitting a first set of indicators of the one or more indicators associated with the first RAT using a channel that is associated with the first RAT. In some examples, to support receiving the one or more indicators, the communications coordination component 1335 may be configured as or otherwise support a means for receiving one or more communications using the first RAT and the second RAT based on the DSS configuration.

In some examples, the indicator transmission component 1330 may be configured as or otherwise support a means for transmitting a second set of indicators of the one or more indicators associated with the second RAT, the second set of indicators being different from the first set of indicators. In some examples, the communications coordination component 1335 may be configured as or otherwise support a means for receiving one or more communications associated with the first RAT and the second RAT based on the DSS configuration.

In some examples, the one or more indicators include one or more preemption indications, one or more cancellation indications, one or more slot format indications, power control indicators, or any combination thereof.

In some examples, the first RAT associated with a first subcarrier spacing and the second RAT associated with a second subcarrier spacing that is different from the first subcarrier spacing.

Additionally, or alternatively, the communications manager 1320 may support wireless communication at a network entity in accordance with examples as disclosed herein. In some examples, the DSS configuration component 1325 may be configured as or otherwise support a means for receiving a message that includes an indication of a UE capability to support DSS using a set of resources shared between a first RAT and a second RAT. The multiplexing component 1340 may be configured as or otherwise support a means for communicating with a UE using one or more multiplexing modes associated with the first RAT and the second RAT using the set of resources.

In some examples, the multiplexing component 1340 may be configured as or otherwise support a means for communicating with the UE using the one or more multiplexing modes based on the UE capability, where the one or more multiplexing modes include a TDM mode, a FDM mode, a SDM mode, or any combination thereof.

In some examples, the first RAT is associated with a first waveform and the second RAT is associated with a second waveform, and the multiplexing component 1340 may be configured as or otherwise support a means for communicating with the UE using the one or more multiplexing modes based on the first waveform and the second waveform, where the one or more multiplexing modes include a TDM mode, a FDM mode, a SDM mode, or any combination thereof.

In some examples, the communications coordination component 1335 may be configured as or otherwise support a means for communicating with the UE using a first set of carriers associated with the first RAT and a second set of carriers associated with the second RAT.

In some examples, the communications coordination component 1335 may be configured as or otherwise support a means for receiving a set of one or more channels using the set of resources in accordance with the UE capability, the set of one or more channels being common to the first RAT and the second RAT.

Figure 14:
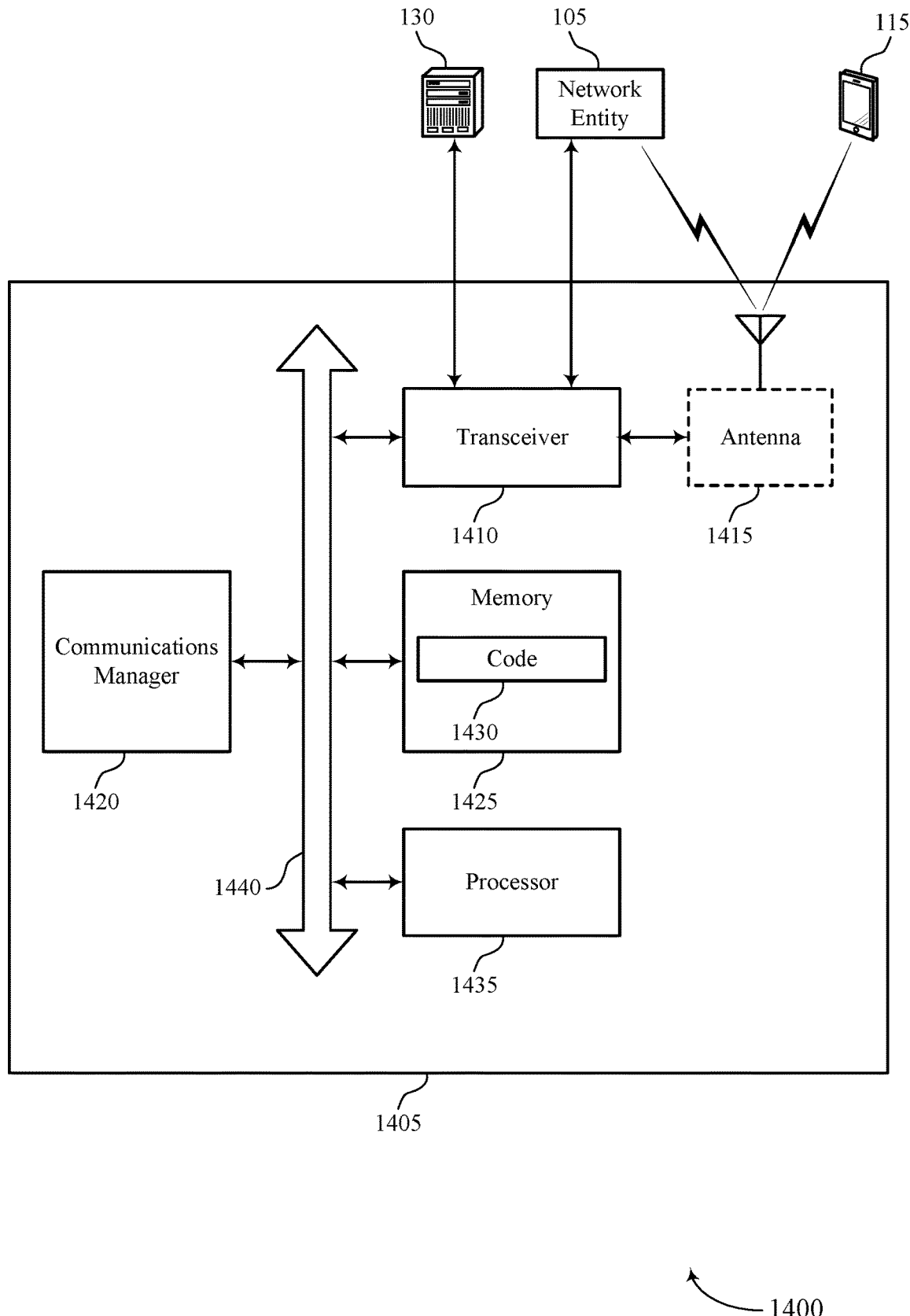
FIG. 14 shows a diagram of a system including a device that supports techniques for DSS across RATs in accordance with various aspects of the present disclosure.

FIG. 14 shows a diagram of a system 1400 including a device 1405 that supports techniques for DSS across RATs in accordance with various aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting techniques for DSS across RATs). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication at a network entity in accordance with examples as disclosed herein. For example, the communications manager 1420 may be configured as or otherwise support a means for transmitting, using a set of resources that are shared between a first RAT and a second RAT supported by a UE, control signaling indicating a DSS configuration for a channel shared between the first RAT and the second RAT. The communications manager 1420 may be configured as or otherwise support a means for transmitting, to the UE, based on the DSS configuration, one or more indicators to coordinate communications using the set of resources, the one or more indicators being associated with the first RAT, the second RAT, or both. The communications manager 1420 may be configured as or otherwise support a means for communicating with the UE in accordance with the DSS configuration using the data channel based on the one or more indicators.

Additionally, or alternatively, the communications manager 1420 may support wireless communication at a network entity in accordance with examples as disclosed herein. For example, the communications manager 1420 may be configured as or otherwise support a means for receiving a message that includes an indication of a UE capability to support DSS using a set of resources shared between a first RAT and a second RAT. The communications manager 1420 may be configured as or otherwise support a means for communicating with a UE using one or more multiplexing modes associated with the first RAT and the second RAT using the set of resources.

By including or configuring the communications manager 1420 in accordance with examples as described herein, the device 1405 may support techniques for improved communication reliability, more efficient utilization of communication resources, improved coordination between devices, reduced resource overhead, greater spectral efficiency, efficient transition between RATs, increased support for different UE capability in a wireless communications network.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of techniques for DSS across RATs as described herein, or the processor 1435 and the memory 1425 may be otherwise configured to perform or support such operations.

Figure 15:
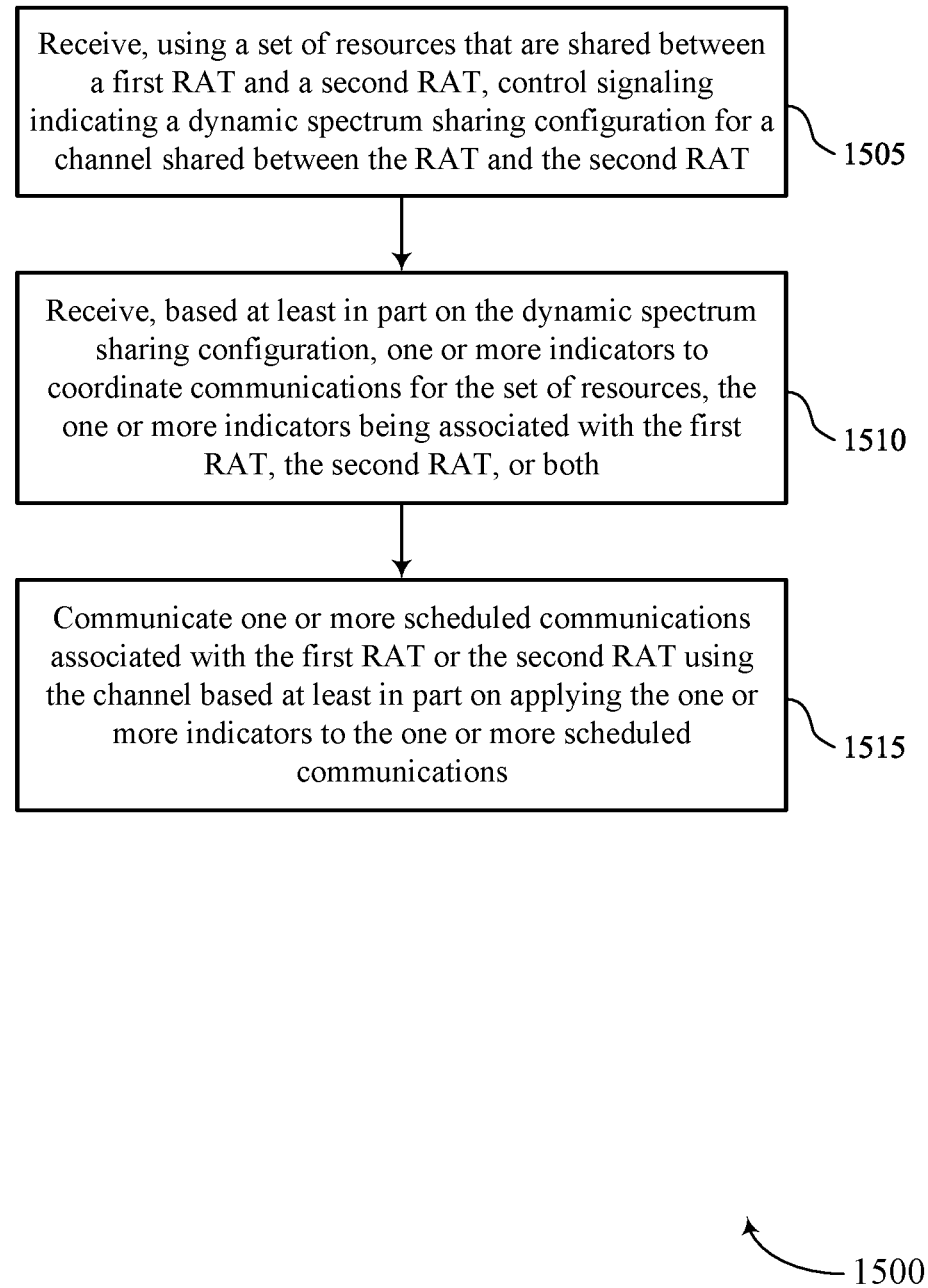
FIGS. 15 through 22 show flowcharts illustrating methods that support techniques for DSS across RATs in accordance with various aspects of the present disclosure.

FIG. 15 shows a flowchart illustrating a method 1500 that supports techniques for DSS across RATs in accordance with various aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving, using a set of resources that are shared between a first RAT and a second RAT, control signaling indicating a DSS configuration for a channel shared between the RAT and the second RAT. The operations of 1505 may be performed in accordance with examples as disclosed herein. In some examples, aspects of the operations of 1505 may be performed by a DSS configuration component 925 as described with reference to FIG. 9.

At 1510, the method may include receiving, based on the DSS configuration, one or more indicators to coordinate communications for the set of resources, the one or more indicators being associated with the first RAT, the second RAT, or both. The operations of 1510 may be performed in accordance with examples as disclosed herein. In some examples, aspects of the operations of 1510 may be performed by an indicator receiving component 930 as described with reference to FIG. 9.

At 1515, the method may include communicating one or more scheduled communications associated with the first RAT or the second RAT using the data channel based on applying the one or more indicators to the one or more scheduled communications. The operations of 1515 may be performed in accordance with examples as disclosed herein. In some examples, aspects of the operations of 1515 may be performed by a communication coordination component 935 as described with reference to FIG. 9.

Figure 16:
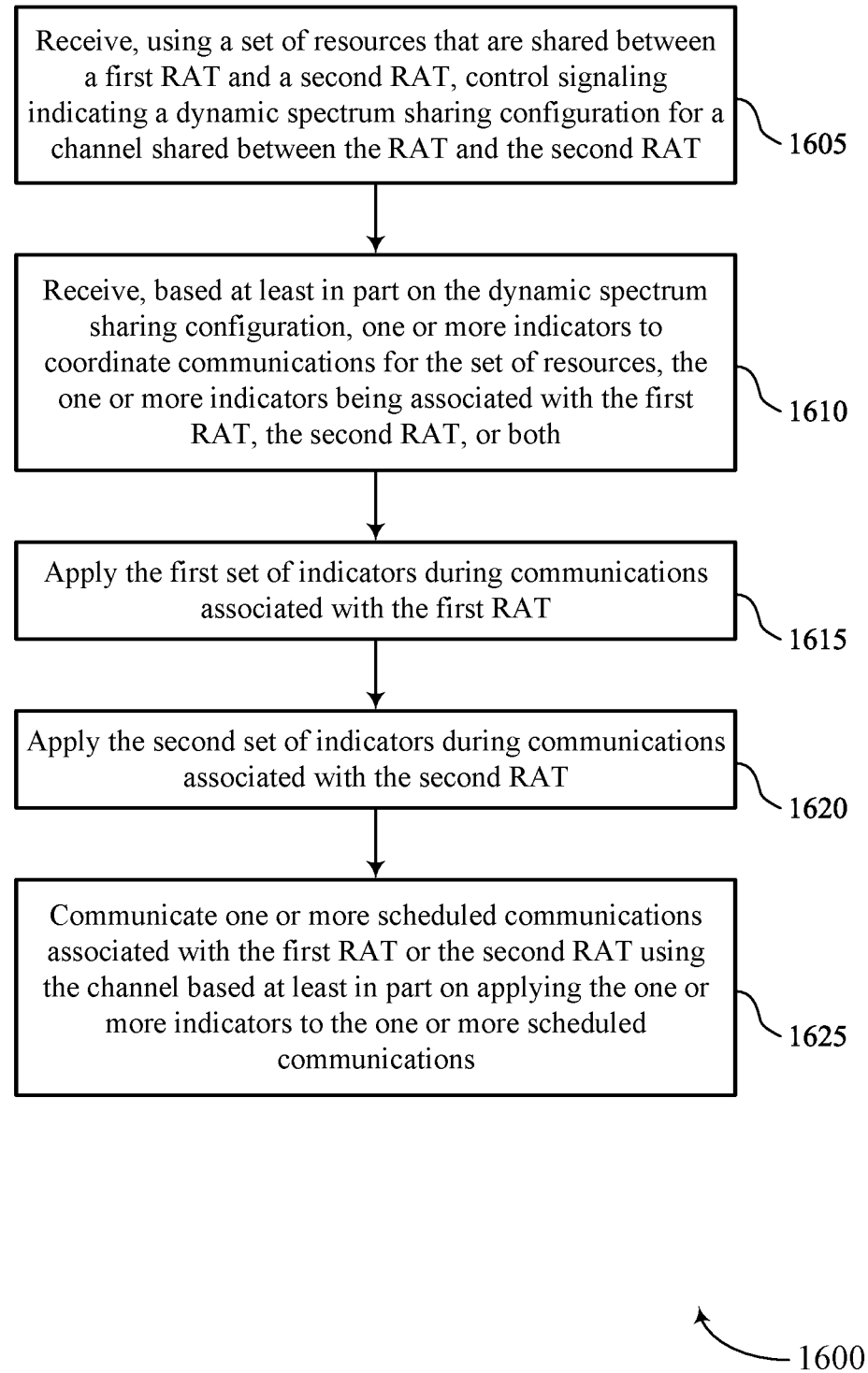

FIG. 16 shows a flowchart illustrating a method 1600 that supports techniques for DSS across RATs in accordance with various aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving, using a set of resources that are shared between a first RAT and a second RAT, control signaling indicating a DSS configuration for a channel shared between the RAT and the second RAT. The operations of 1605 may be performed in accordance with examples as disclosed herein. In some examples, aspects of the operations of 1605 may be performed by a DSS configuration component 925 as described with reference to FIG. 9.

At 1610, the method may include receiving, based on the DSS configuration, one or more indicators to coordinate communications for the set of resources, the one or more indicators being associated with the first RAT, the second RAT, or both. The operations of 1610 may be performed in accordance with examples as disclosed herein. In some examples, aspects of the operations of 1610 may be performed by an indicator receiving component 930 as described with reference to FIG. 9.

At 1615, the method may include applying the first set of indicators during communications associated with the first RAT. The operations of 1615 may be performed in accordance with examples as disclosed herein. In some examples, aspects of the operations of 1615 may be performed by an indicator coordination component 950 as described with reference to FIG. 9.

At 1620, the method may include applying the second set of indicators during communications associated with the second RAT. The operations of 1620 may be performed in accordance with examples as disclosed herein. In some examples, aspects of the operations of 1620 may be performed by an indicator coordination component 950 as described with reference to FIG. 9.

At 1625, the method may include communicating one or more scheduled communications associated with the first RAT or the second RAT using the data channel based on applying the one or more indicators to the one or more scheduled communications. The operations of 1625 may be performed in accordance with examples as disclosed herein. In some examples, aspects of the operations of 1625 may be performed by a communication coordination component 935 as described with reference to FIG. 9.

Figure 17:
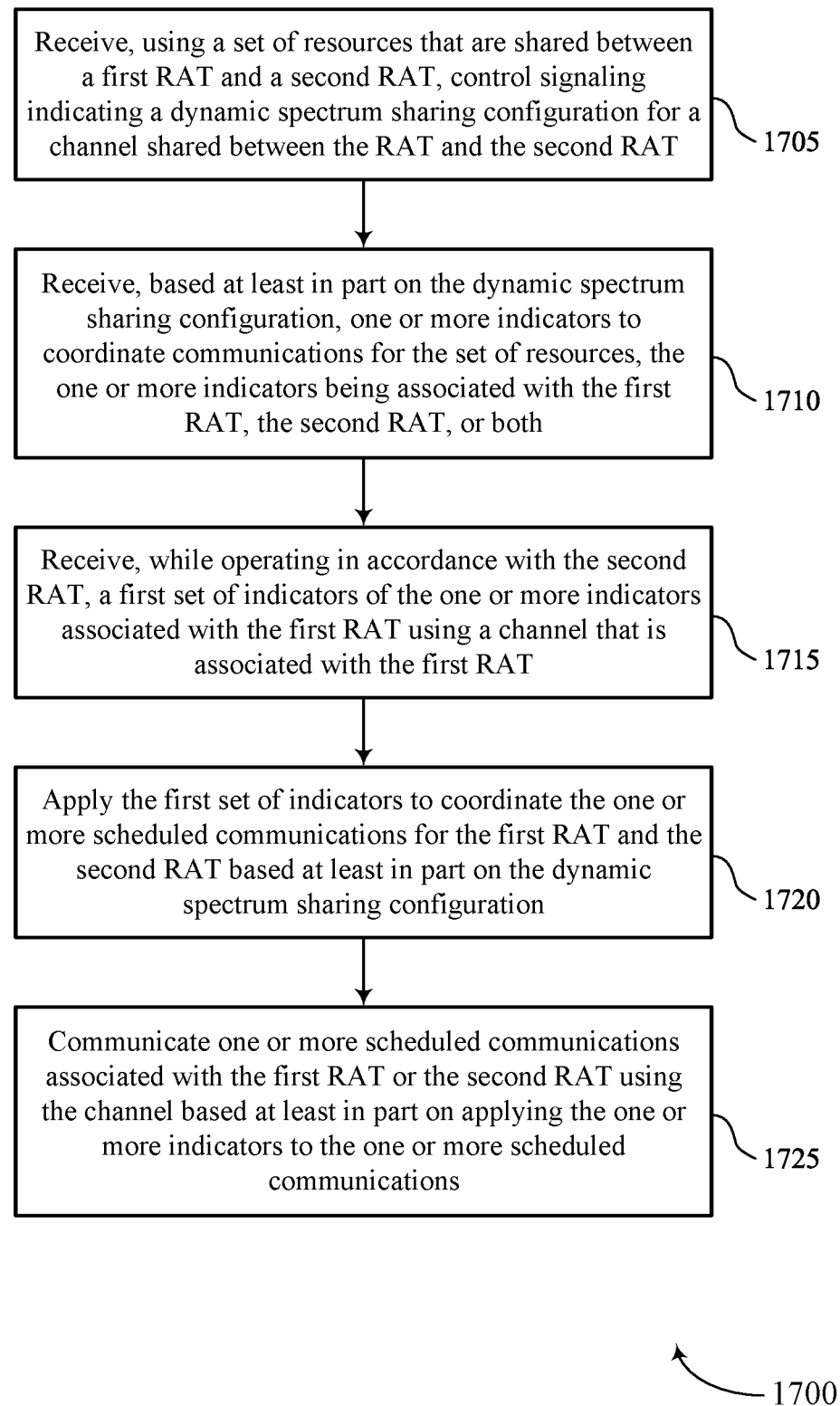

FIG. 17 shows a flowchart illustrating a method 1700 that supports techniques for DSS across RATs in accordance with various aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving, using a set of resources that are shared between a first RAT and a second RAT, control signaling indicating a DSS configuration for a channel shared between the RAT and the second RAT. The operations of 1705 may be performed in accordance with examples as disclosed herein. In some examples, aspects of the operations of 1705 may be performed by a DSS configuration component 925 as described with reference to FIG. 9.

At 1710, the method may include receiving, based on the DSS configuration, one or more indicators to coordinate communications for the set of resources, the one or more indicators being associated with the first RAT, the second RAT, or both. The operations of 1710 may be performed in accordance with examples as disclosed herein. In some examples, aspects of the operations of 1710 may be performed by an indicator receiving component 930 as described with reference to FIG. 9.

At 1715, the method may include receiving, while operating in accordance with the second RAT, a first set of indicators of the one or more indicators associated with the first RAT using a channel that is associated with the first RAT. The operations of 1715 may be performed in accordance with examples as disclosed herein. In some examples, aspects of the operations of 1715 may be performed by an indicator receiving component 930 as described with reference to FIG. 9.

At 1720, the method may include applying the first set of indicators to coordinate the one or more scheduled communications for the first RAT and the second RAT based on the DSS configuration. The operations of 1720 may be performed in accordance with examples as disclosed herein. In some examples, aspects of the operations of 1720 may be performed by an indicator coordination component 950 as described with reference to FIG. 9.

At 1725, the method may include communicating one or more scheduled communications associated with the first RAT or the second RAT using the data channel based on applying the one or more indicators to the one or more scheduled communications. The operations of 1725 may be performed in accordance with examples as disclosed herein. In some examples, aspects of the operations of 1725 may be performed by a communication coordination component 935 as described with reference to FIG. 9.

Figure 18:
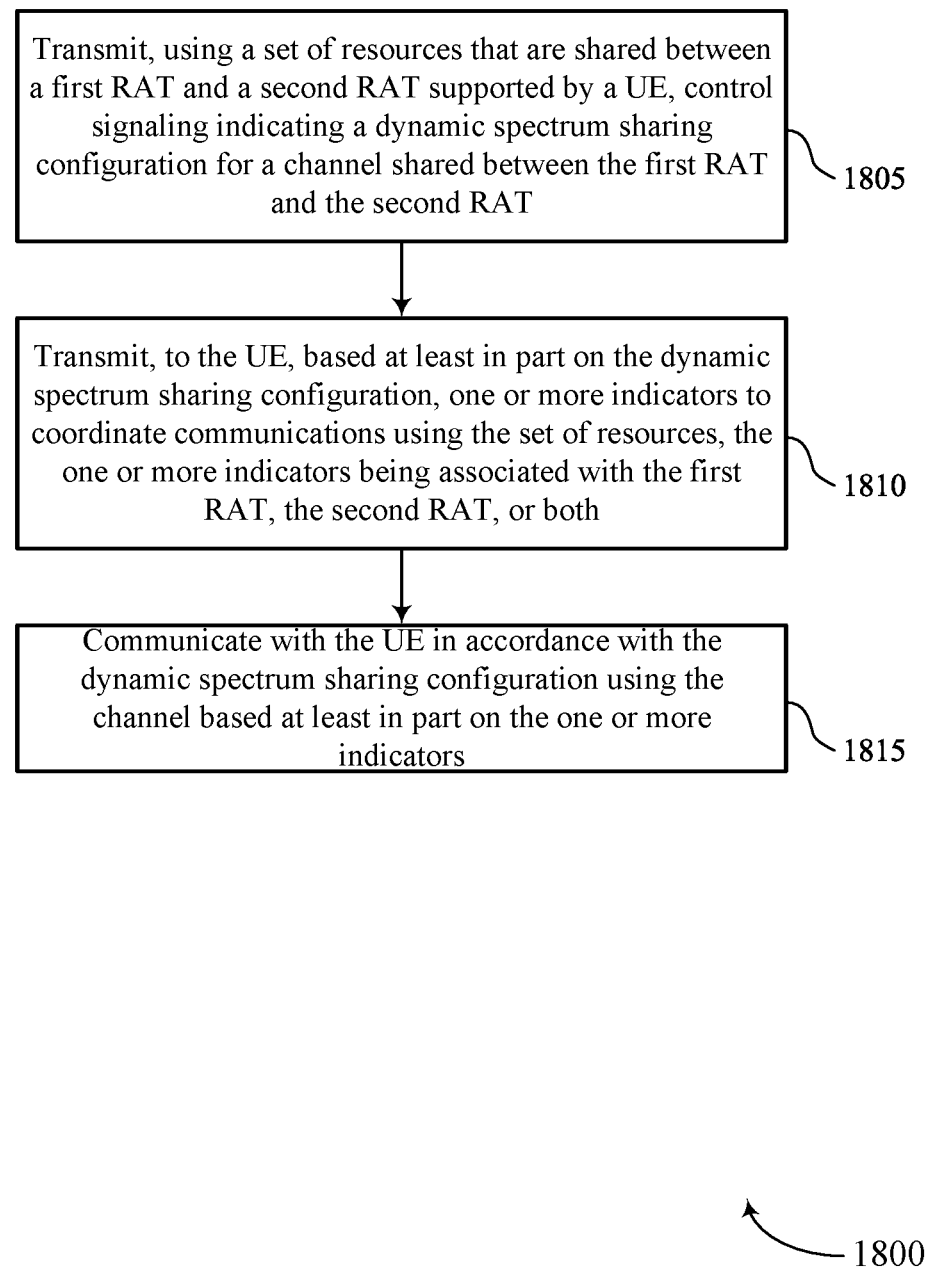

FIG. 18 shows a flowchart illustrating a method 1800 that supports techniques for DSS across RATs in accordance with various aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting, using a set of resources that are shared between a first RAT and a second RAT supported by a UE, control signaling indicating a DSS configuration for a channel shared between the first RAT and the second RAT. The operations of 1805 may be performed in accordance with examples as disclosed herein. In some examples, aspects of the operations of 1805 may be performed by a DSS configuration component 1325 as described with reference to FIG. 13.

At 1810, the method may include transmitting, to the UE, based on the DSS configuration, one or more indicators to coordinate communications using the set of resources, the one or more indicators being associated with the first RAT, the second RAT, or both. The operations of 1810 may be performed in accordance with examples as disclosed herein. In some examples, aspects of the operations of 1810 may be performed by an indicator transmission component 1330 as described with reference to FIG. 13.

At 1815, the method may include communicating with the UE in accordance with the DSS configuration using the data channel based on the one or more indicators. The operations of 1815 may be performed in accordance with examples as disclosed herein. In some examples, aspects of the operations of 1815 may be performed by a communications coordination component 1335 as described with reference to FIG. 13.

Figure 19:
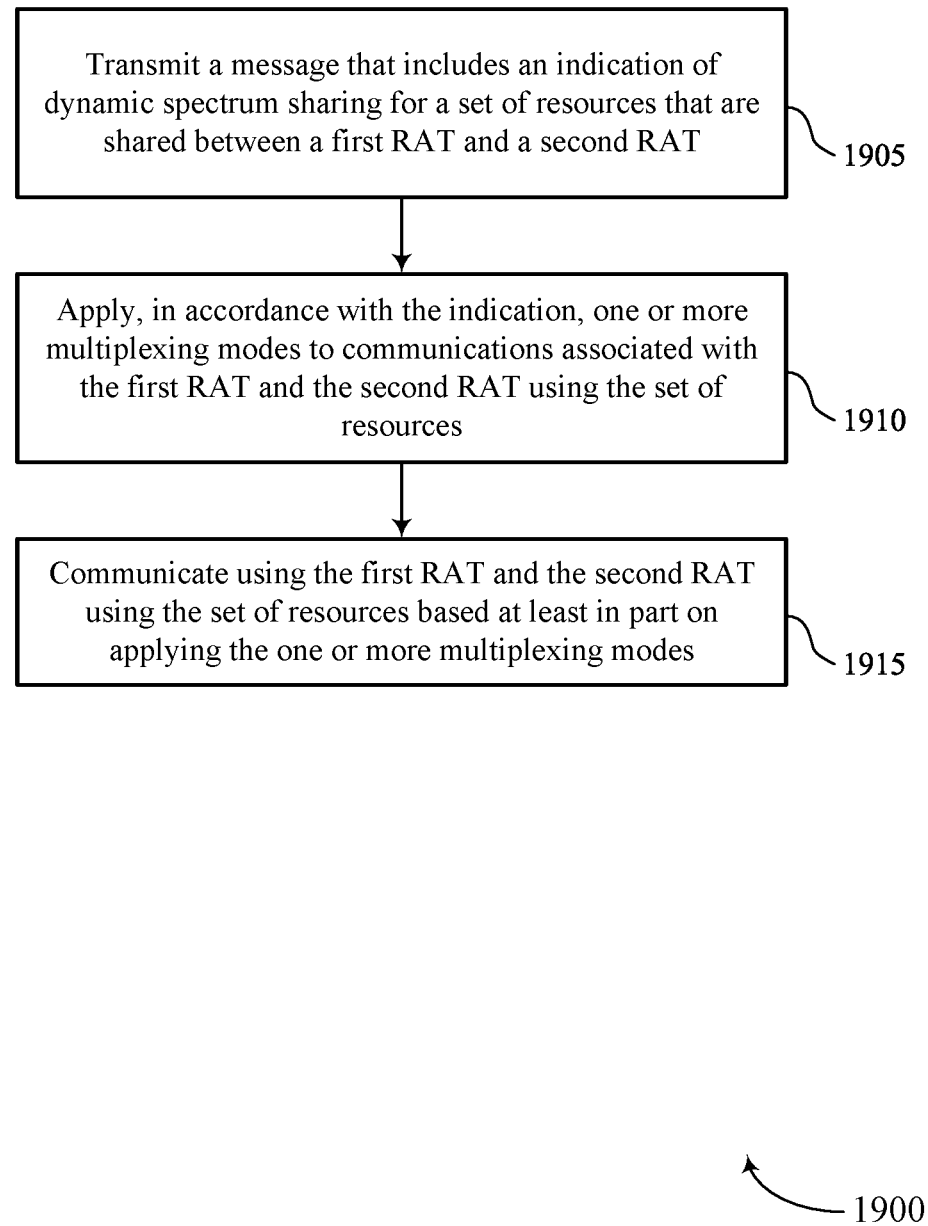

FIG. 19 shows a flowchart illustrating a method 1900 that supports techniques for DSS across RATs in accordance with various aspects of the present disclosure. The operations of the method 1900 may be implemented by a UE or its components as described herein. For example, the operations of the method 1900 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1905, the method may include transmitting a message that includes an indication of a UE capability to support DSS for a set of resources that are shared between a first RAT and a second RAT. The operations of 1905 may be performed in accordance with examples as disclosed herein. In some examples, aspects of the operations of 1905 may be performed by a DSS configuration component 925 as described with reference to FIG. 9.

At 1910, the method may include applying, in accordance with the UE capability, one or more multiplexing modes to communications associated with the first RAT and the second RAT using the set of resources. The operations of 1910 may be performed in accordance with examples as disclosed herein. In some examples, aspects of the operations of 1910 may be performed by a multiplexing mode application component 940 as described with reference to FIG. 9.

At 1915, the method may include communicating using the first RAT and the second RAT using the set of resources based on applying the one or more multiplexing modes. The operations of 1915 may be performed in accordance with examples as disclosed herein. In some examples, aspects of the operations of 1915 may be performed by a multiplexing component 945 as described with reference to FIG. 9.

Figure 20:
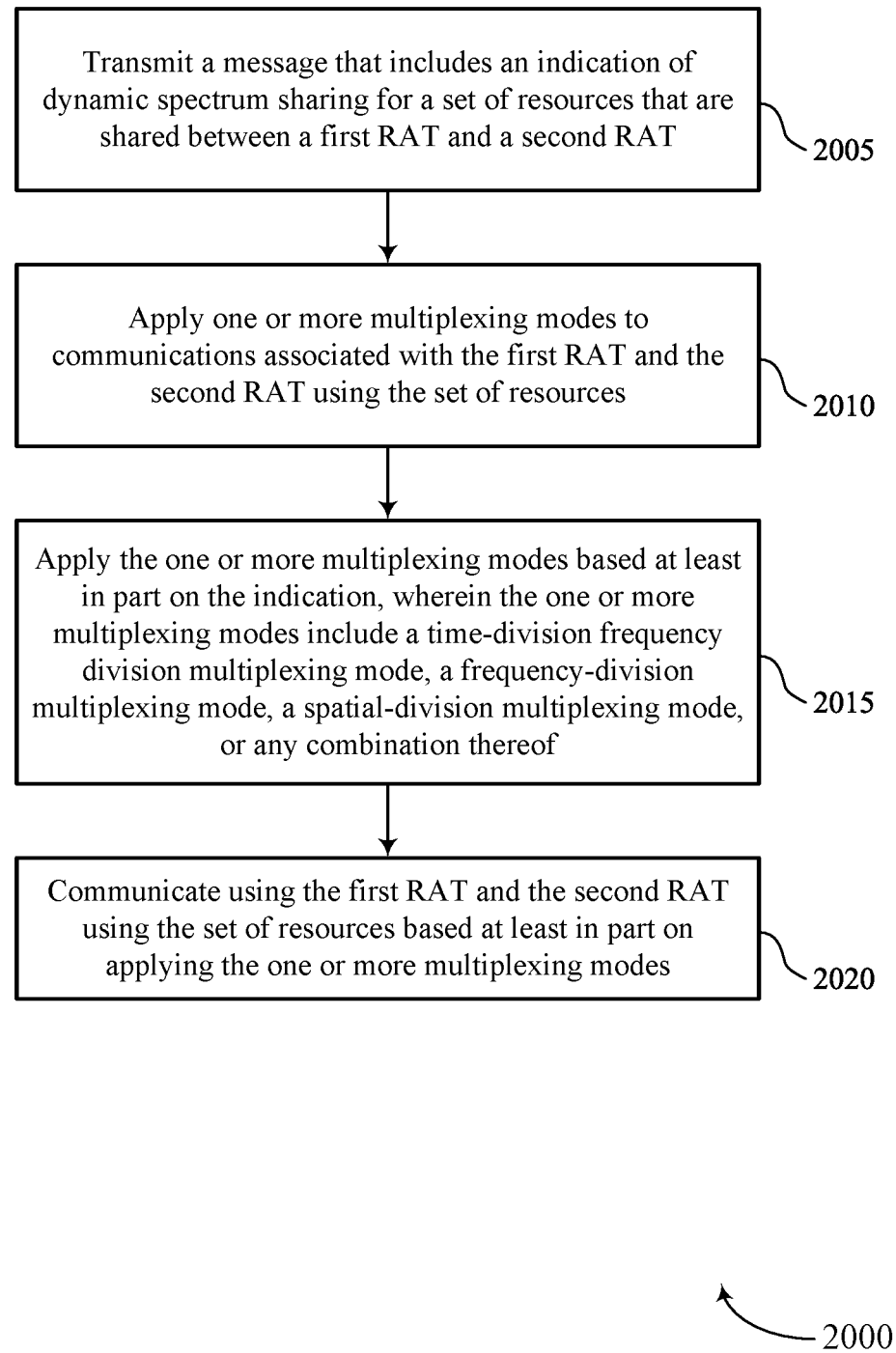

FIG. 20 shows a flowchart illustrating a method 2000 that supports techniques for DSS across RATs in accordance with various aspects of the present disclosure. The operations of the method 2000 may be implemented by a UE or its components as described herein. For example, the operations of the method 2000 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 2005, the method may include transmitting a message that includes an indication of a UE capability to support DSS for a set of resources that are shared between a first RAT and a second RAT. The operations of 2005 may be performed in accordance with examples as disclosed herein. In some examples, aspects of the operations of 2005 may be performed by a DSS configuration component 925 as described with reference to FIG. 9.

At 2010, the method may include applying, in accordance with the UE capability, one or more multiplexing modes to communications associated with the first RAT and the second RAT using the set of resources. The operations of 2010 may be performed in accordance with examples as disclosed herein. In some examples, aspects of the operations of 2010 may be performed by a multiplexing mode application component 940 as described with reference to FIG. 9.

At 2015, the method may include applying the one or more multiplexing modes based on the UE capability, where the one or more multiplexing modes include a TDM mode, a FDM mode, a SDM mode, or any combination thereof. The operations of 2015 may be performed in accordance with examples as disclosed herein. In some examples, aspects of the operations of 2015 may be performed by a multiplexing mode application component 940 as described with reference to FIG. 9.

At 2020, the method may include communicating using the first RAT and the second RAT using the set of resources based on applying the one or more multiplexing modes. The operations of 2020 may be performed in accordance with examples as disclosed herein. In some examples, aspects of the operations of 2020 may be performed by a multiplexing component 945 as described with reference to FIG. 9.

Figure 21:
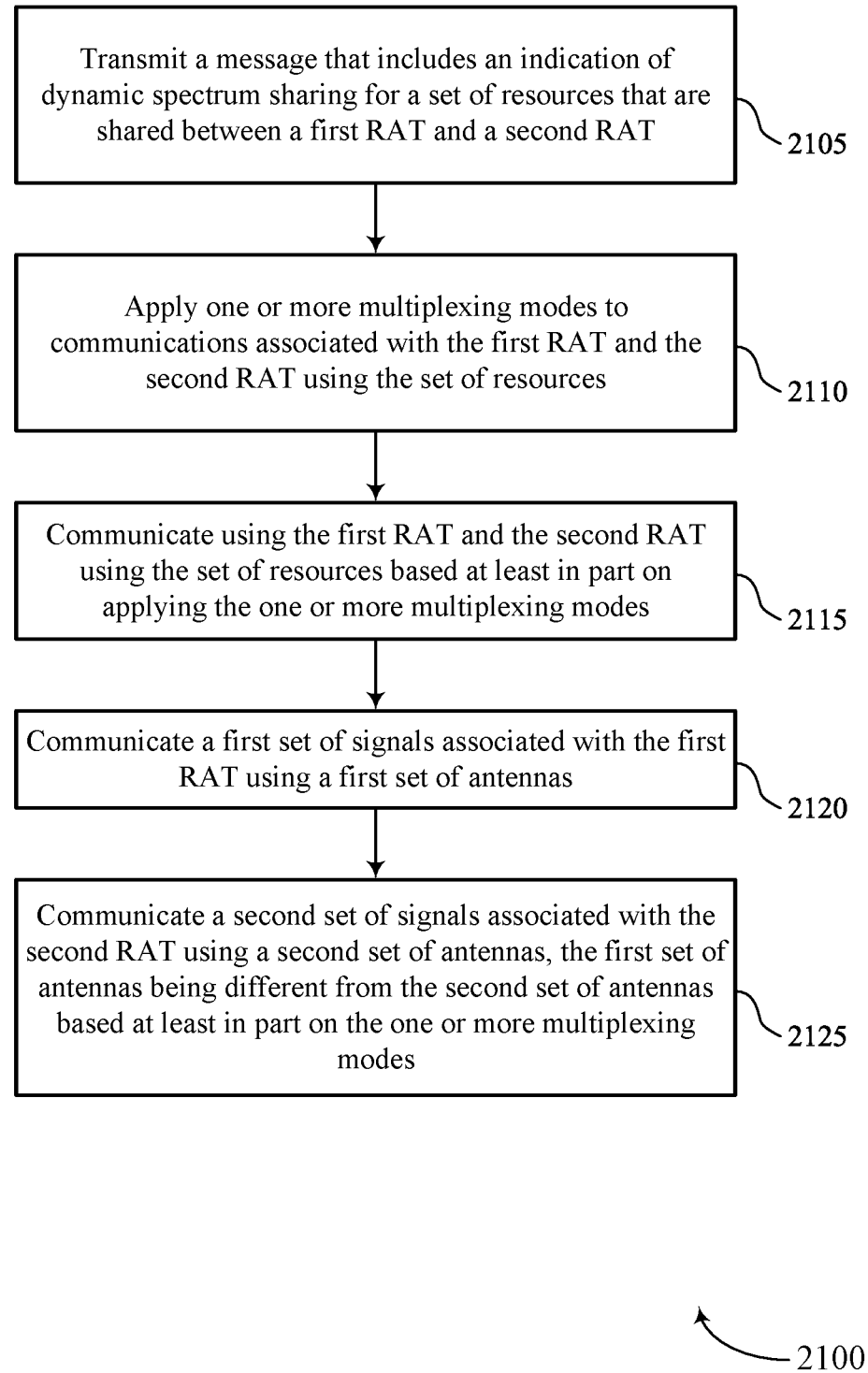

FIG. 21 shows a flowchart illustrating a method 2100 that supports techniques for DSS across RATs in accordance with various aspects of the present disclosure. The operations of the method 2100 may be implemented by a UE or its components as described herein. For example, the operations of the method 2100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 2105, the method may include transmitting a message that includes an indication of a UE capability to support DSS for a set of resources that are shared between a first RAT and a second RAT. The operations of 2105 may be performed in accordance with examples as disclosed herein. In some examples, aspects of the operations of 2105 may be performed by a DSS configuration component 925 as described with reference to FIG. 9.

At 2110, the method may include applying, in accordance with the UE capability, one or more multiplexing modes to communications associated with the first RAT and the second RAT using the set of resources. The operations of 2110 may be performed in accordance with examples as disclosed herein. In some examples, aspects of the operations of 2110 may be performed by a multiplexing mode application component 940 as described with reference to FIG. 9.

At 2115, the method may include communicating using the first RAT and the second RAT using the set of resources based on applying the one or more multiplexing modes. The operations of 2115 may be performed in accordance with examples as disclosed herein. In some examples, aspects of the operations of 2115 may be performed by a multiplexing component 945 as described with reference to FIG. 9.

At 2120, the method may include communicating a first set of signals associated with the first RAT using a first set of antennas. The operations of 2120 may be performed in accordance with examples as disclosed herein. In some examples, aspects of the operations of 2120 may be performed by an antenna selection component 960 as described with reference to FIG. 9.

At 2125, the method may include communicating a second set of signals associated with the second RAT using a second set of antennas, the first set of antennas being different from the second set of antennas based on the one or more multiplexing modes. The operations of 2125 may be performed in accordance with examples as disclosed herein. In some examples, aspects of the operations of 2125 may be performed by an antenna selection component 960 as described with reference to FIG. 9.

Figure 22:
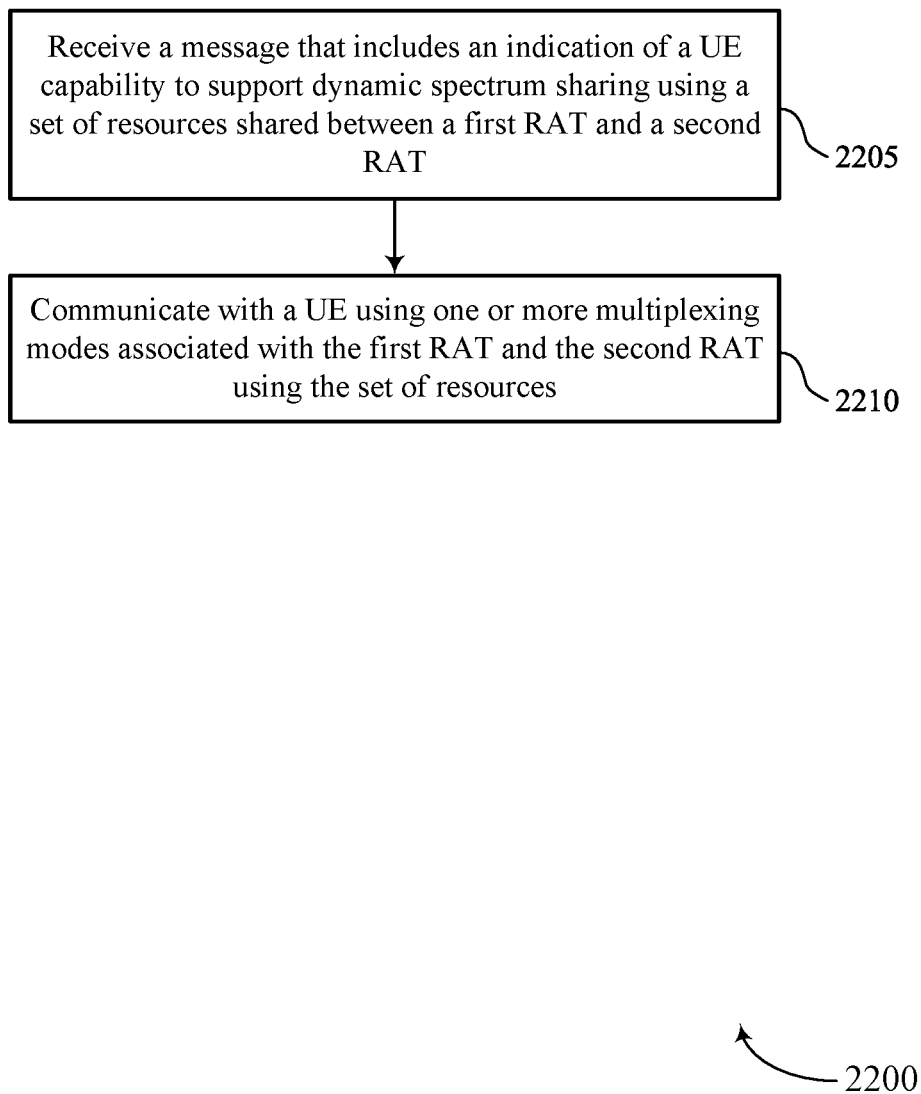

FIG. 22 shows a flowchart illustrating a method 2200 that supports techniques for DSS across RATs in accordance with various aspects of the present disclosure. The operations of the method 2200 may be implemented by a network entity or its components as described herein. For example, the operations of the method 2200 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2205, the method may include receiving a message that includes an indication of a UE capability to support DSS using a set of resources shared between a first RAT and a second RAT. The operations of 2205 may be performed in accordance with examples as disclosed herein. In some examples, aspects of the operations of 2205 may be performed by a DSS configuration component 1325 as described with reference to FIG. 13.

At 2210, the method may include communicating with a UE using one or more multiplexing modes associated with the first RAT and the second RAT using the set of resources. The operations of 2210 may be performed in accordance with examples as disclosed herein. In some examples, aspects of the operations of 2210 may be performed by a multiplexing component 1340 as described with reference to FIG. 13.

The following provides an overview of aspects of the present disclosure:

Aspect 1: A method for wireless communication at a UE, comprising: receiving, using a set of resources that are shared between a first RAT and a second RAT, control signaling indicating a DSS configuration for a channel shared between the RAT and the second RAT; receiving, based at least in part on the DSS configuration, one or more indicators to coordinate communications for the set of resources, the one or more indicators being associated with the first RAT, the second RAT, or both; and communicating one or more scheduled communications associated with the first RAT or the second RAT using the channel based at least in part on applying the one or more indicators to the one or more scheduled communications.

Aspect 2: The method of aspect 1, wherein the one or more indicators include a first set of indicators associated with the first RAT and a second set of indicators associated with the second RAT, the method further comprising: applying the first set of indicators during communications associated with the first RAT; and applying the second set of indicators during communications associated with the second RAT.

Aspect 3: The method of any of aspects 1 through 2, wherein receiving the one or more indicators further comprises: receiving, while operating in accordance with the second RAT, a first set of indicators of the one or more indicators associated with the first RAT using a channel that is associated with the first RAT; and applying the first set of indicators to coordinate the one or more scheduled communications for the first RAT and the second RAT based at least in part on the DSS configuration.

Aspect 4: The method of aspect 3, further comprising: receiving, while operating in accordance with the second RAT, a second set of indicators of the one or more indicators associated with the second RAT, the second set of indicators being different from the first set of indicators; and applying the second set of indicators to coordinate the one or more scheduled communications for the first RAT and the second RAT based at least in part on the DSS configuration.

Aspect 5: The method of any of aspects 1 through 4, wherein receiving the one or more indicators further comprises: receiving a first indicator that conflicts with at least a second indicator of the one or more indicators; applying a set of priority rules based at least in part on the conflict; and applying the first indicator or the second indicator in accordance with the set of priority rules.

Aspect 6: The method of aspect 5, wherein the set of priority rules indicate a priority based on RAT type, channel type, information type, scheduling type, physical channel properties, channel use case, or any combination thereof.

Aspect 7: The method of any of aspects 1 through 6, wherein the one or more indicators comprise one or more preemption indications, one or more cancellation indications, one or more slot format indications, one or more power control indications, or any combination thereof.

Aspect 8: The method of any of aspects 1 through 7, wherein the first RAT associated with a first subcarrier spacing and the second RAT associated with a second subcarrier spacing that is different from the first subcarrier spacing.

Aspect 9: The method of any of aspects 1 through 8, wherein the first RAT comprises a fifth generation (5G) RAT and the second RAT comprises a sixth generation (6G) RAT.

Aspect 10: A method for wireless communication at a network entity, comprising: transmitting, using a set of resources that are shared between a first RAT and a second RAT supported by a UE, control signaling indicating a DSS configuration for a channel shared between the first RAT and the second RAT; transmitting, to the UE, based at least in part on the DSS configuration, one or more indicators to coordinate communications using the set of resources, the one or more indicators being associated with the first RAT, the second RAT, or both; and communicating with the UE in accordance with the DSS configuration using the channel based at least in part on the one or more indicators.

Aspect 11: The method of aspect 10, wherein the one or more indicators include a first set of indicators applicable to communications associated with the first RAT and a second set of indicators applicable to communications associated with the second RAT.

Aspect 12: The method of any of aspects 10 through 11, wherein receiving the one or more indicators further comprises: transmitting a first set of indicators of the one or more indicators associated with the first RAT using a channel that is associated with the first RAT; and receiving one or more communications using the first RAT and the second RAT based at least in part on the DSS configuration.

Aspect 13: The method of aspect 12, further comprising: transmitting a second set of indicators of the one or more indicators associated with the second RAT, the second set of indicators being different from the first set of indicators; and receiving one or more communications associated with the first RAT and the second RAT based at least in part on the DSS configuration.

Aspect 14: The method of any of aspects 10 through 13, wherein the one or more indicators comprise one or more preemption indications, one or more cancellation indications, one or more slot format indications, one or more power control indications, or any combination thereof.

Aspect 15: The method of any of aspects 10 through 14, wherein the first RAT associated with a first subcarrier spacing and the second RAT associated with a second subcarrier spacing that is different from the first subcarrier spacing.

Aspect 16: A method for wireless communication at a UE, comprising: transmitting a message that includes an indication of DSS for a set of resources that are shared between a first RAT and a second RAT; applying, in accordance with the indication, one or more multiplexing modes to communications associated with the first RAT and the second RAT using the set of resources; and communicating using the first RAT and the second RAT using the set of resources based at least in part on applying the one or more multiplexing modes.

Aspect 17: The method of aspect 16, further comprising: applying the one or more multiplexing modes based at least in part on the indication, wherein the one or more multiplexing modes include a TDM mode, a FDM mode, a SDM mode, or any combination thereof.

Aspect 18: The method of any of aspects 16 through 17, wherein the first RAT is associated with a first waveform and the second RAT is associated with a second waveform, the method further comprising: applying the one or more multiplexing modes based at least in part on the first waveform and the second waveform, wherein the one or more multiplexing modes include a TDM mode, a FDM mode, a SDM mode, or any combination thereof.

Aspect 19: The method of any of aspects 16 through 18, further comprising: applying the one or more multiplexing modes based at least in part on a type of communications associated with the first RAT and the second RAT scheduled for the set of resources.

Aspect 20: The method of any of aspects 16 through 19, wherein the one or more multiplexing modes include a FDM mode, a SDM mode, or both, the method further comprising: communicating a first set of signals associated with the first RAT using a first set of antennas; and communicating a second set of signals associated with the second RAT using a second set of antennas, the first set of antennas being different from the second set of antennas based at least in part on the one or more multiplexing modes.

Aspect 21: The method of aspect 20, wherein the first set of signals associated with the first RAT are associated with a first set of carriers and the second set of signals associated with the second RAT are associated with a second set of carriers.

Aspect 22: The method of any of aspects 16 through 21, wherein the message further indicates a first number of antenna ports supported for the first RAT, a second number of antenna ports supported for the second RAT, or a third number of antenna ports supported for both the first RAT and the second RAT.

Aspect 23: The method of any of aspects 16 through 22, further comprising: transmitting a set of one or more channels using the set of resources in accordance with the indication, the set of one or more channels being common to the first RAT and the second RAT.

Aspect 24: The method of any of aspects 16 through 23, wherein the first RAT associated with a first subcarrier spacing and the second RAT associated with a second subcarrier spacing that is different from the first subcarrier spacing.

Aspect 25: The method of any of aspects 16 through 24, wherein the first RAT comprises a fifth generation (5G) RAT and the second RAT comprises a sixth generation (6G) RAT.

Aspect 26: The method of any of aspects 16 through 25, wherein the indication comprises a UE capability indication for the UE to support DSS for the set of resources that are shared between the first RAT and the second RAT.

Aspect 27: A method for wireless communication at a network entity, comprising: receiving a message that includes an indication of a UE capability to support DSS using a set of resources shared between a first RAT and a second RAT; and communicating with a UE using one or more multiplexing modes associated with the first RAT and the second RAT using the set of resources.

Aspect 28: The method of aspect 27, further comprising: communicating with the UE using the one or more multiplexing modes based at least in part on the indication, wherein the one or more multiplexing modes include a TDM mode, a FDM mode, a SDM mode, or any combination thereof.

Aspect 29: The method of any of aspects 27 through 28, wherein the first RAT is associated with a first waveform and the second RAT is associated with a second waveform, the method further comprising: communicating with the UE using the one or more multiplexing modes based at least in part on the first waveform and the second waveform, wherein the one or more multiplexing modes include a TDM mode, a FDM mode, a SDM mode, or any combination thereof.

Aspect 30: The method of any of aspects 27 through 29, further comprising: communicating with the UE using a first set of carriers associated with the first RAT and a second set of carriers associated with the second RAT.

Aspect 31: An apparatus for wireless communication at a UE, comprising a processor; memory coupled with the processor; and instructions stored in the memory and executable by the processor to cause the apparatus to perform a method of any of aspects 1 through 9.

Aspect 32: An apparatus for wireless communication at a UE, comprising at least one means for performing a method of any of aspects 1 through 9.

Aspect 33: A non-transitory computer-readable medium storing code for wireless communication at a UE, the code comprising instructions executable by a processor to perform a method of any of aspects 1 through 9.

Aspect 34: An apparatus for wireless communication at a network entity, comprising a processor; memory coupled with the processor; and instructions stored in the memory and executable by the processor to cause the apparatus to perform a method of any of aspects 10 through 15.

Aspect 35: An apparatus for wireless communication at a network entity, comprising at least one means for performing a method of any of aspects 10 through 15.

Aspect 36: A non-transitory computer-readable medium storing code for wireless communication at a network entity, the code comprising instructions executable by a processor to perform a method of any of aspects 10 through 15.

Aspect 37: An apparatus for wireless communication at a UE, comprising a processor; memory coupled with the processor; and instructions stored in the memory and executable by the processor to cause the apparatus to perform a method of any of aspects 16 through 26.

Aspect 38: An apparatus for wireless communication at a UE, comprising at least one means for performing a method of any of aspects 16 through 26.

Aspect 39: A non-transitory computer-readable medium storing code for wireless communication at a UE, the code comprising instructions executable by a processor to perform a method of any of aspects 16 through 26.

Aspect 40: An apparatus for wireless communication at a network entity, comprising a processor; memory coupled with the processor; and instructions stored in the memory and executable by the processor to cause the apparatus to perform a method of any of aspects 27 through 30.

Aspect 41: An apparatus for wireless communication at a network entity, comprising at least one means for performing a method of any of aspects 27 through 30.

Aspect 42: A non-transitory computer-readable medium storing code for wireless communication at a network entity, the code comprising instructions executable by a processor to perform a method of any of aspects 27 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc, in which case disks may reproduce data magnetically, whereas discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, using a set of resources that are shared between a first radio access technology (RAT) and a second RAT, control signaling indicating a dynamic spectrum sharing configuration for a channel shared between the first RAT and the second RAT;
   receiving, based at least in part on the dynamic spectrum sharing configuration, a first set of indicators associated with the first RAT and a second set of indicators associated with the second RAT wherein the first set of indicators and the second set of indicators comprise one or more preemption indications, one or more cancellation indications, one or more slot format indications, or any combination thereof to coordinate communications for the set of resources; and
   communicating one or more scheduled communications associated with the first RAT or the second RAT using the channel based at least in part on applying the first set of indicators or the second set of indictors to the one or more scheduled communications.

2. The method of claim 1, further comprising:
   applying the first set of indicators during communications associated with the first RAT; and
   applying the second set of indicators during communications associated with the second RAT.

3. The method of claim 1, wherein receiving the first set of indicators and the second set of indicators further comprises:

receiving, while operating in accordance with the second RAT, the first set of indicators associated with the first RAT using a channel that is associated with the first RAT; and applying the first set of indicators to coordinate the one or more scheduled communications for the first RAT and the second RAT based at least in part on the dynamic spectrum sharing configuration.

4. The method of claim 3, further comprising:
receiving, while operating in accordance with the second RAT, the second set of indicators associated with the second RAT, the second set of indicators being different from the first set of indicators; and
applying the second set of indicators to coordinate the one or more scheduled communications for the first RAT and the second RAT based at least in part on the dynamic spectrum sharing configuration.

5. The method of claim 1, wherein receiving the first set of indicators and the second set of indicators further comprises:
receiving a first indicator of the first set of indicators that conflicts with at least a second indicator of the second set of indicators;
applying a set of priority rules based at least in part on the conflict; and
applying the first indicator or the second indicator in accordance with the set of priority rules.

6. The method of claim 5, wherein the set of priority rules indicate a priority based on RAT type, channel type, information type, scheduling type, physical channel properties, channel use case, or any combination thereof.

7. The method of claim 1, wherein the first RAT associated with a first subcarrier spacing and the second RAT associated with a second subcarrier spacing that is different from the first subcarrier spacing.

8. The method of claim 1, wherein the first RAT comprises a fifth generation (5G) RAT and the second RAT comprises a sixth generation (6G) RAT.

9. A method for wireless communication at a network entity, comprising:
transmitting, using a set of resources that are shared between a first radio access technology (RAT) and a second RAT supported by a user equipment (UE), control signaling indicating a dynamic spectrum sharing configuration for a channel shared between the first RAT and the second RAT;
transmitting, to the UE, based at least in part on the dynamic spectrum sharing configuration, a first set of indicators associated with the first RAT and a second set of indicators associated with the second RAT, wherein the first set of indicators and the second set of indicators comprise one or more preemption indications, one or more cancellation indications, one or more slot format indications, or any combination thereof to coordinate communications for the set of resources; and
communicating with the UE in accordance with the dynamic spectrum sharing configuration using the channel based at least in part on the first set of indicators or the second set of indictors.

10. The method of claim 9, wherein transmitting the first set of indicators and the second set of indicators further comprises:
transmitting the first set of indicators associated with the first RAT using a channel that is associated with the first RAT; and receiving one or more communications using the first RAT and the second RAT based at least in part on the dynamic spectrum sharing configuration.

11. The method of claim 10, further comprising:
transmitting the second set of indicators associated with the second RAT, the second set of indicators being different from the first set of indicators; and
receiving one or more communications associated with the first RAT and the second RAT based at least in part on the dynamic spectrum sharing configuration.

12. The method of claim 9, wherein the first RAT associated with a first subcarrier spacing and the second RAT associated with a second subcarrier spacing that is different from the first subcarrier spacing.

13. A method for wireless communication at a user equipment (UE), comprising:
transmitting a message that includes an indication of dynamic spectrum sharing for a set of resources that are shared between a first radio access technology (RAT) and a second RAT;
applying, in accordance with the indication, a first multiplexing mode to communications associated with the first RAT based at least in part on a first waveform associated with the first RAT and applying a second multiplexing mode to communications associated with the second RAT based at least in part on a second waveform associated with the second RAT using the set of resources, wherein the first multiplexing mode is different from the second multiplexing mode; and
communicating using the first RAT and the second RAT using the set of resources based at least in part on applying the first multiplexing mode and the second multiplexing mode.

14. The method of claim 13,
wherein the first multiplexing mode includes a time-division multiplexing mode, a frequency-division multiplexing mode, a spatial-division multiplexing mode, or any combination thereof.

15. The method of claim 13, wherein
the second multiplexing mode includes a time-division multiplexing mode, a frequency-division multiplexing mode, a spatial-division multiplexing mode, or any combination thereof.

16. The method of claim 13, further comprising:
applying the first multiplexing mode or the second multiplexing mode based at least in part on a type of communications associated with the first RAT and the second RAT scheduled for the set of resources.

17. The method of claim 13, further comprising:
communicating a first set of signals associated with the first RAT using a first set of antennas; and
communicating a second set of signals associated with the second RAT using a second set of antennas, the first set of antennas being different from the second set of antennas based at least in part on the first multiplexing mode or the second multiplexing mode.

18. The method of claim 17, wherein the first set of signals associated with the first RAT are associated with a first set of carriers and the second set of signals associated with the second RAT are associated with a second set of carriers.

19. The method of claim 13, wherein the message further indicates a first number of antenna ports supported for the first RAT, a second number of antenna ports supported for the second RAT, or a third number of antenna ports supported for both the first RAT and the second RAT.

20. The method of claim 13, further comprising:
transmitting a set of one or more channels using the set of resources in accordance with the indication, the set of one or more channels being common to the first RAT and the second RAT.

21. The method of claim 13, wherein the first RAT associated with a first subcarrier spacing and the second RAT associated with a second subcarrier spacing that is different from the first subcarrier spacing.

22. The method of claim 13, wherein the first RAT comprises a fifth generation (5G) RAT and the second RAT comprises a sixth generation (6G) RAT.

23. The method of claim 13, wherein the indication comprises a UE capability indication for the UE to support dynamic spectrum sharing for the set of resources that are shared between the first RAT and the second RAT.

24. A method for wireless communication at a network entity, comprising:
receiving a message that includes an indication of a user equipment (UE) capability to support dynamic spectrum sharing using a set of resources shared between a first radio access technology (RAT) and a second RAT; and
communicating with a UE using a first multiplexing mode associated with the first RAT based at least in part on a first waveform associated with the first RAT and using a second multiplexing mode associated with the second RAT based at least in part on a second waveform associated with the second RAT using the set of resources, wherein the first multiplexing mode is different from the second multiplexing mode.

25. The method of claim 24, further comprising:
communicating with the UE using the first multiplexing mode or the second multiplexing mode based at least in part on the indication, wherein the first multiplexing mode or the second multiplexing mode include a time-division multiplexing mode, a frequency-division multiplexing mode, a spatial-division multiplexing mode, or any combination thereof.

26. The method of claim 24, further comprising:
communicating with the UE using a first set of carriers associated with the first RAT and a second set of carriers associated with the second RAT.

* * * * *